(12) United States Patent
Sawyers-Abbott et al.

(10) Patent No.: US 11,377,221 B2
(45) Date of Patent: Jul. 5, 2022

(54) INLET COWL DEFLECTION LIMITING STRUT

(71) Applicant: RAYTHEON TECHNOLOGIES CORPORATION, Farmington, CT (US)

(72) Inventors: Nigel David Sawyers-Abbott, South Glastonbury, CT (US); Frederick M. Schwarz, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 116 days.

(21) Appl. No.: 17/028,578

(22) Filed: Sep. 22, 2020

(65) Prior Publication Data

US 2021/0139155 A1  May 13, 2021

Related U.S. Application Data

(62) Division of application No. 15/681,987, filed on Aug. 21, 2017, now Pat. No. 10,814,993.

(51) Int. Cl.
*B64D 27/26* (2006.01)
*F02C 7/20* (2006.01)
*F01D 25/28* (2006.01)
*F02K 3/06* (2006.01)

(52) U.S. Cl.
CPC .............. *B64D 27/26* (2013.01); *F01D 25/28* (2013.01); *F02C 7/20* (2013.01); *F02K 3/06* (2013.01); *B64D 2027/262* (2013.01); *B64D 2027/268* (2013.01); *F05D 2220/323* (2013.01); *F05D 2240/90* (2013.01); *F05D 2260/80* (2013.01)

(58) Field of Classification Search
CPC .............. B64D 27/26; B64D 2027/262; B64D 2027/264; B64D 2027/266; B64D 2027/268; F02C 7/20
See application file for complete search history.

(56) References Cited

U.S. PATENT DOCUMENTS

| | | |
|---|---|---|
| 3,675,418 A | 7/1972 | Lenkeit et al. |
| 4,013,246 A | 3/1977 | Nightingale |
| 4,022,018 A | 5/1977 | Tuten et al. |
| 4,458,863 A | 7/1984 | Smith |
| 5,277,382 A | 1/1994 | Seelen |
| 5,452,575 A | 9/1995 | Freid |
| 5,746,391 A | 5/1998 | Rodgers |
| 5,860,275 A | 1/1999 | Newton |

(Continued)

OTHER PUBLICATIONS

European Patent Office, European Office Action dated Oct. 8, 2020 in Application No. 18189038.5.

(Continued)

*Primary Examiner* — Brian M O'Hara
*Assistant Examiner* — Michael B. Kreiner
(74) *Attorney, Agent, or Firm* — Snell & Wilmer L.L.P.

(57) ABSTRACT

A turbofan engine may comprise an inlet and a fan case coupled to the inlet. An engine case may be coupled to the fan case via a vane extending between the fan case and the engine case. A strut apparatus may extend from the fan case and limit deflection of the fan case. The strut apparatus may comprise a first end proximate the fan case, and a second end coupled to at least one of the engine case or a structure for mounting the turbofan engine to an aircraft.

8 Claims, 17 Drawing Sheets

(56) References Cited

U.S. PATENT DOCUMENTS

| | | | |
|---|---|---|---|
| 6,976,655 B2 | 12/2005 | Thompson | |
| 7,806,363 B2 | 10/2010 | Udall | |
| 7,845,158 B2 | 12/2010 | Udall | |
| 7,866,142 B2 | 1/2011 | Beardsley | |
| 8,215,580 B2 | 7/2012 | Balk | |
| 8,444,085 B2 | 5/2013 | Stretton | |
| 8,876,042 B2 | 11/2014 | LaChapelle | |
| 8,979,491 B2 | 3/2015 | Heyerman | |
| 10,144,524 B2 | 12/2018 | Binks et al. | |
| 10,273,017 B2 * | 4/2019 | Wright | B64D 45/00 |
| 10,464,685 B2 | 11/2019 | Whiteford et al. | |
| 2008/0135679 A1 | 6/2008 | Udall | |
| 2013/0074517 A1 | 3/2013 | Suciu | |

OTHER PUBLICATIONS

European Patent Office, European Partial Search Report dated Feb. 7, 2019 in Application No. 18189038.5.

European Patent Offce, European Search Report dated May 13, 2019 in Application No. 18189038.5.

USPTO, Pre-Interview First Office Action dated Dec. 31, 2019 in U.S. Appl. No. 15/681,987.

USPTO, First Action Interview Office Action dated May 29, 2020 in U.S. Appl. No. 15/681,987.

USPTO, Notice of Allowance dated Aug. 20, 2020 in U.S. Appl. No. 15/681,987.

* cited by examiner

INLET COWL DEFLECTION LIMITING STRUT

CROSS REFERENCE TO RELATED APPLICATIONS

This application is a divisional of, and claims priority to, U.S. Ser. No. 15/681,987 filed on Aug. 21, 2017 and entitled "INLET COWL DEFLECTION LIMITING STRUT," which is hereby incorporated by reference in its entirety for all purposes.

FIELD

The present disclosure relates to turbofan engines and, more particularly, to deflection limiting strut apparatuses for turbofan engines.

BACKGROUND

Turbofan engines, such as those that power modern commercial and military aircraft, may include a fan section and a core. The air that is blown by the fan may be split between a bypass duct to provide thrust and a core of the engine. In the core, the air may be received by a compressor section to pressurize the air.

The fan may be located radially inward from an inlet and from a fan case of the turbofan engine. A fan exit guide vane may be coupled to the fan case and the core and may retain the core in place relative to the fan case. As air is received by the inlet, the air may apply a radially outward load on the inlet, producing a deflection which may travel through the fan case to the core, where the load may deflect areas of the core away from a central axis of the turbofan engine. Such deflection of the core may undesirably affect tip clearances, causing contact between rotating blades and casing structures of the core.

SUMMARY

Disclosed herein is a strut apparatus for use with a turbofan engine. The strut apparatus may comprise a first end disposed proximate a fan case of the turbofan engine and a second end coupled to a deflection resistant structure aft of the fan case.

In various embodiments, the first end of the strut apparatus may be coupled to a bottom of the fan case. The deflection resistant structure may comprise at least one of a turbine exhaust case of the turbofan engine, a pylon coupled to the turbofan engine, or an engine mount coupled between the pylon and the turbofan engine.

In various embodiments, the first end of the strut apparatus may be located proximate a flange of the fan case. The deflection resistant structure may comprise at least one of a thrust reverser support or a pylon coupled to the turbofan engine.

In various embodiments, the strut apparatus may comprise a strut slidably coupled to a frame. In various embodiments, the strut apparatus may comprise a Y-shaped strut. The first end of the strut apparatus may be coupled to the fan case via a pin joint to accommodate circumferential rotation of the fan case.

In various embodiments, the strut apparatus may comprise a length adjustment mechanism configured to adjust a length of the strut apparatus extending from the first end of the strut apparatus to the second end of the strut apparatus.

A turbofan engine is disclosed according to various embodiments. The turbofan engine may comprise an inlet and a fan case coupled to the inlet. An engine case may be coupled to the fan case via a vane extending between the fan case and the engine case. A strut apparatus may extend from the fan case. The strut apparatus may comprise a first end proximate the fan case, and a second end coupled to at least one of the engine case or a structure for mounting the turbofan engine to an aircraft.

In various embodiments, the strut apparatus may further comprise a first actuator coupled between the first end and the second end and configured to receive a first electronic control signal and to at least one of increase or decrease a length of the strut based on the first electronic control signal.

In various embodiments, the strut may further comprise a first portion, a second portion, and a first turning section positioned between the first portion and the second portion and rotatably coupled to at least one of the first portion or the second portion via threading such that the first actuator is configured to at least one of increase or decrease the length of the strut by rotating the first turning section relative to at least one of the first portion or the second portion to move the first turning section along the threading.

A method for controlling a strut for limiting distortion of a fan case of a turbofan engine is disclosed according to various embodiments. The method may comprise receiving, from a sensor, sensor data usable to predict a temperature of a portion of the turbofan engine. The method also includes predicting, by a controller, a current predicted temperature of the portion of the turbofan engine based on the sensor data. The method may further comprise controlling, by the controller, the strut to at least one of increase or decrease a strut length of the strut based on the current predicted temperature to reduce distortion of a centerline of a core of the turbofan engine.

In various embodiments, the sensor may comprise at least one of a temperature sensor configured to detect a current temperature of the portion of the turbofan engine or another portion of the turbofan engine or a speed sensor configured to detect a current speed of a compressor section or a turbine section of the turbofan engine.

In various embodiments, controlling the strut to at least one of increase or decrease the strut length may comprise transmitting a first control signal to a first actuator of the strut to cause the first actuator to at least one of increase or decrease the strut length.

In various embodiments, controlling the strut to at least one of increase or decrease the strut length may further include detecting, by a position sensor of the strut, a current strut length of the strut, and transmitting a second control signal to the first actuator of the strut to cause the first actuator to at least one of increase or decrease the strut length in response to the current strut length of the strut being different than a desired strut length of the strut.

In various embodiments, controlling the strut to at least one of increase or decrease the strut length may further include detecting, by a position sensor of the strut, a current strut length of the strut, and transmitting a second control signal to a second actuator of the strut to cause the second actuator to at least one of increase or decrease the strut length in response to the current strut length of the strut being different than a desired strut length of the strut.

In various embodiments, controlling the strut to at least one of increase or decrease the strut length may further include transmitting a first control signal to a first actuator of the strut to cause the first actuator to at least one of increase or decrease the strut length by a first amount, and transmitting a second control signal to a second actuator of the strut to cause the second actuator to at least one of increase or decrease the strut length by a second amount, the first amount and the second amount each being greater than zero.

In various embodiments, controlling the strut to at least one of increase or decrease the strut length may further include transmitting a first control signal to a first actuator of the strut to cause the first actuator to at least one of increase or decrease the strut length during a first flight of the turbofan engine, transmitting a second control signal to a second actuator of the strut to cause the second actuator to at least one of increase or decrease the strut length during a subsequent flight of the turbofan engine, and continuing to alternate between transmitting the first control signal to the first actuator and transmitting the second control signal to the second actuator during future subsequent flights of the turbofan engine.

In various embodiments, the method may further comprise determining a desired strut length by comparing the current predicted temperature to a lookup table to predict thermal expansion of the engine case based on the current predicted temperature or calculating an equation using the current predicted temperature to predict the thermal expansion of the engine case.

In various embodiments, the method may further comprise detecting, by a strain gauge, a current load applied to the fan case by the strut, predicting, by the controller, that the turbofan engine will change from an idle state to a takeoff state in which the turbofan engine is generating takeoff power, and controlling the strut to increase the strut length to apply a pre-load to the fan case based on the current load to resist additional distortion of the centerline of the core of the turbofan engine due to a fan load applied to the engine case from a fan of the turbofan engine during the takeoff state in response to predicting that the turbofan engine will change from the idle state to the takeoff state.

Any of the foregoing embodiments may also include detecting, by a strain gauge, a current load applied to the fan case by the strut, predicting, by the controller, that the turbofan engine will change from a runway state in which an axis of the turbofan engine is parallel to a ground to a climbing state in which a forward end of the turbofan engine is farther from the ground than an aft end of the turbofan engine, and controlling the strut to increase the strut length to apply a pre-load to the fan case based on the current load to resist additional distortion of the centerline of the core of the turbofan engine due to a wind load applied to an inlet of the turbofan engine in response to predicting that the turbofan engine will change from the runway state to the climbing state.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

Figure 1:
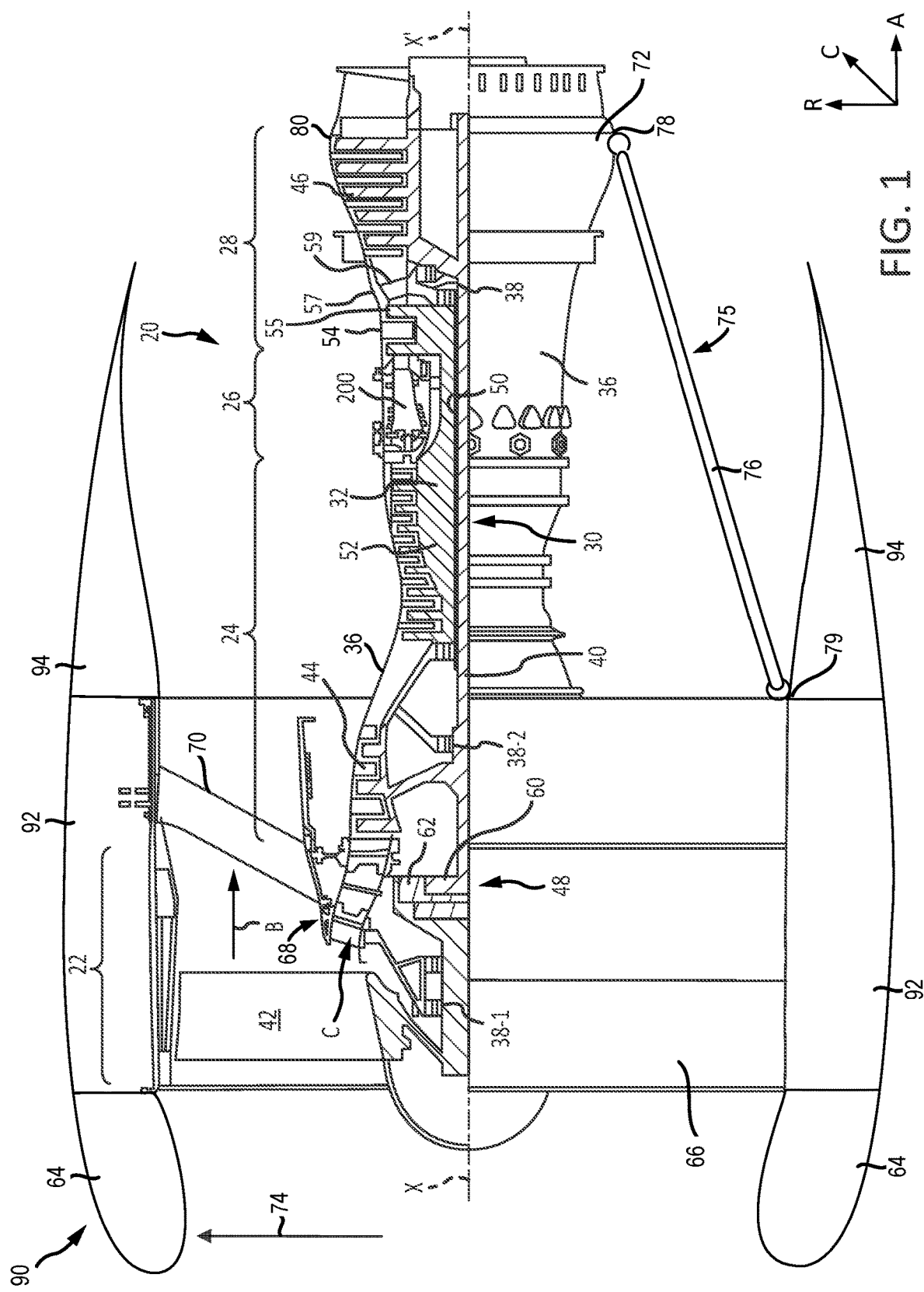
FIG. 1 illustrates a schematic cross-section of a turbofan engine having a strut apparatus mounted thereto, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the exhaust (e.g., the back end) of a turbofan engine. As used herein, "forward" refers to the direction associated with the intake (e.g., the front end) of a turbofan engine. As used herein, "distal" refers to the direction outward, or generally, away from a reference component. As used herein, "proximate" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

In various embodiments and with reference to FIG. 1, a turbofan engine 20 is provided. An A-R-C axis is shown in FIG. 1 to illustrate the axial, radial, and circumferential directions, respectively. The turbofan engine 20 may be a two-turbine turbofan that generally incorporates a fan section 22, which may be driven by a gearbox 62, a compressor section 24, a combustor section 26, and a turbine section 28. Alternative engines may also include, for example, an augmentor section among other systems or features. In operation, the fan section 22 can drive air along a bypass flow path B while the compressor section 24 can drive air along a core flow path C for compression and communication into the combustor section 26 then expansion through the turbine section 28. Although turbofan engine 20 is depicted as a two-turbine turbofan engine herein, it should be understood that the concepts described herein are not limited to use with two-turbine turbofans as the teachings may be applied to other types of turbine engines including turbojet, turboprop, turboshaft, or power generation turbines, with or without geared fan, geared compressor or three-turbine architectures.

The turbofan engine 20 may generally comprise a low speed rotor 30 and a high speed rotor 32 mounted for rotation about an engine central longitudinal axis X-X' relative to an engine static structure 36 (also referred to as an engine case) via several bearing systems 38, 38-1, and 38-2. Low speed rotor 30 may be inboard of the low pressure compressor 44 and the low pressure turbine 46. High speed rotor 32 may be located proximate high pressure compressor 52 and a high pressure turbine 54. It should be understood that various bearing systems 38 at various locations may alternatively or additionally be provided, including for example, the bearing system 38, the bearing system 38-1, and the bearing system 38-2.

The low speed rotor 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed rotor 30. The geared architecture 48 may comprise a gear assembly 60 enclosed within a gear housing 62. The gear assembly 60 couples the inner shaft 40 to a rotating fan structure. The high speed rotor 32 may comprise an outer shaft 50 that interconnects a high pressure compressor 52 and high pressure turbine 54. A combustor 200 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

The airflow of core flow path C may be received and conditioned by a fan exit guide vane 70. After conditioning, the airflow of core flow path C may be compressed by the low pressure compressor 44 then the high pressure compressor 52, mixed and burned with fuel in the combustor 200, then expanded over the high pressure turbine 54 and the low pressure turbine 46. The turbines 46, 54 rotationally drive the respective low speed rotors 30 and high speed rotors 32 in response to the expansion.

The turbofan engine 20 may be, for example, a high-bypass ratio geared engine. In various embodiments, the bypass ratio of the turbofan engine 20 may be greater than about six (6). In various embodiments, the bypass ratio of the turbofan engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the turbofan engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other turbofan engines including direct drive turbofans. A turbofan engine may comprise an industrial gas turbine (IGT) or a geared engine, such as a geared turbofan, or non-geared engine, such as a turboshaft, or may comprise any turbofan engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis X-X'. The compressor section 24 and turbine section 28 may be referred to as rotor systems. Within the rotor systems of the turbofan engine 20 are multiple rotor disks, which may include one or more cover plates or minidisks. Minidisks may be configured to receive balancing weights or inserts for balancing the rotor systems.

A nacelle 90 comprising an inlet 64, a fan cowl 92, and a thrust reverser 94 may be disposed around (i.e., radially outward of) turbofan engine 20. Inlet 64 may be coupled to a forward portion of a fan case 66 of engine 20. Fan case 66 may be an annular structure disposed radially outward of fan 42. In response to forward movement of the turbofan engine 20, air may be drawn into the inlet 64 where it may be received by the fan 42. A portion of the air received by the inlet 64 may be received as the core airflow C, and a portion of the air may be received as the bypass airflow B. The core airflow C may flow through a core 68 of turbofan engine 20. Core 68 of turbofan engine 20 may include compressor section 24, combustor section 26, and turbine section 28. Engine case 36 may be located around core 68. Engine case 36 may include or be coupled to various casings or support structures along core 68. For example, engine case 36 may include or be coupled to compressor casings, turbine casings, vane casings and/or vane supports, rotor casings and/or blade outer air seals (BOAS) and/or BOAS supports, and exhaust casings.

In response to forward movement of the turbofan engine 20, air entering inlet 64 may create a load 74 which is applied to inlet 64. Fan case 66 may be coupled to inlet 64. In that regard, load 74 may be transferred from the inlet 64 to the fan case 66. Fan case 66 may be coupled to engine case 36 via a fan exit guide vane 70. In that regard, load 74 may be transferred to engine case 36 and various components along core 68 via fan case 66 and fan exit guide vane 70. Load 74 may undesirably distort the centerline of core 68 by distorting the centerline of engine case 36. Stated differently, load 74 may undesirably distort and/or bend engine case 36 and other structures located along core 68 away from the centerline of the rotors along core 68 (i.e., away from the engine central longitudinal axis X-X'). Distorting the centerline of engine case 36 may alter tip clearances of rotors along core 68, thereby producing rub events (i.e., contacts between the rotor blades and the casing surrounding the rotor blade) and/or leakage over the rotor tips. In various embodiments, rub events may be more likely in an aft end of the compressor section 24, as the aft end of the compressor section 24 tends to be located relatively far from bearing supports where the rotors and casing centerlines are likely to be the same.

To reduce distortion of core 68, a strut apparatus 75 may be coupled to turbofan engine 20. Strut apparatus 75 may be configured to resist deflection of fan case 66. In various embodiments, strut apparatus 75 may include a strut 76 coupled to fan case 66 and a deflection resistant structure aft of fan case 66. For example, strut 76 may be coupled between an aft end of fan case 66 and a turbine exhaust case 72 of the engine case 36. Strut 76 may be located proximate a bottom 78 of the turbine exhaust case 72 and proximate a bottom 79 of fan case 66. Bottoms 78 and 79 may be the portions of the turbine exhaust case 72 and fan case 66, respectively, that are nearest to a ground surface when the turbofan engine 20 is coupled to an aircraft that is resting upon the ground surface.

Figure 2:
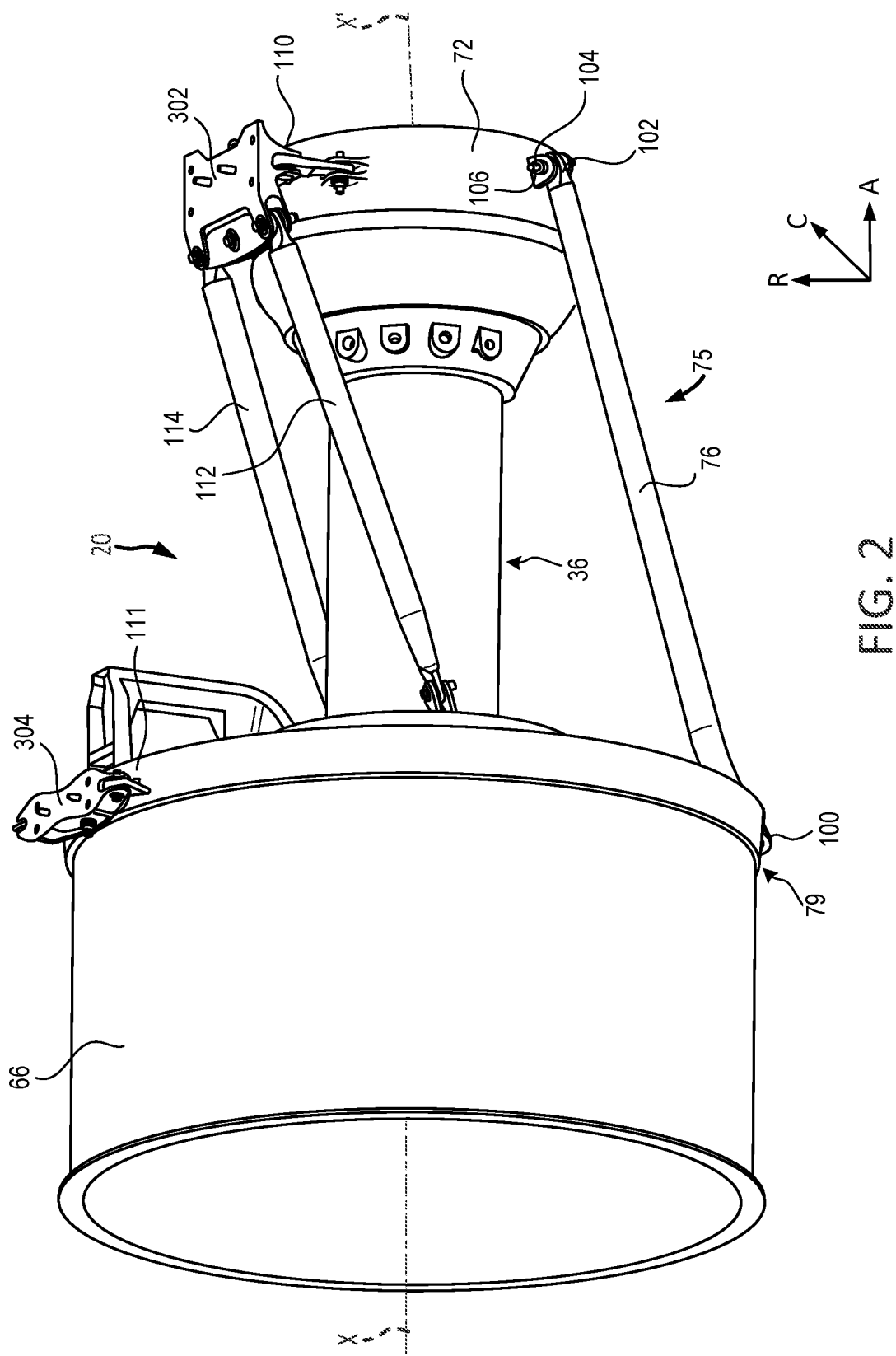
FIG. 2 illustrates a perspective view of a turbofan engine having a strut apparatus coupled to a fan case and an exhaust case, in accordance with various embodiments.

FIG. 2 shows strut 76 coupled to fan case 66 and turbine exhaust case 72, in accordance with various embodiments. In various embodiments, strut 76 may be a unibody member having a first end 100 and a second end 102. In various embodiments, first end 100 may be coupled to the fan case 66 and second end 102 may be coupled to turbine exhaust case 72. The strut 76 may be formed from any of a variety of materials. For example, strut 76 may include a metal, such as aluminum, titanium, steel, and/or alloys thereof. As another example, strut 76 may include a composite material such as a carbon fiber reinforced polymer, a glass reinforced plastic, or the like.

Strut 76 may be coupled to turbine exhaust case 72 via a fastener 104. Fastener 104 may comprise a pin, rivet, bolt, or other suitable securement mechanism. Fastener 104 may extend through an opening defined by second end 102 of strut 76 and through an opening defined by a pair of flanges 106 extending from turbine exhaust case 72. First end 100 of strut 76 may be coupled to bottom 79 of fan case 66 in a similar manner. For example, a pin, rivet, bolt, or other suitable securement mechanism may extend through an opening defined by first end 100 of strut 76 and through an opening defined by a pair of flanges extending from fan case 66. The securement mechanisms at second end 102 and/or first end 100 of strut 76 may be configured to accommodate rotation of fan case 66 and/or turbine exhaust case 72. In various embodiments, strut 76 may be located proximate a side turbine exhaust case 72. For example, strut 76 may be located half way between top 110 and bottom 78 (FIG. 1) of turbine exhaust case 72, as measured along a circumference turbine exhaust case 72. In various embodiments, strut 76 may be located between 45 degrees and 90 degrees from bottom 78 of turbine exhaust case 72, as measured along the circumference turbine exhaust case 72. In various embodiments, strut 76 may be located between 10 degrees and 45 degrees from bottom 78 of turbine exhaust case 72, as measured along the circumference turbine exhaust case 72.

With combined reference to FIGS. 1 and 2, turbine exhaust case 72 may be employed as a deflection resistive structure (i.e., a structure capable of supporting strut 76 to counter load 74 and reduce deflection of fan case 66 and core 68), as turbine exhaust case 72 does not contain rotating elements that may be susceptible to deflections induced by strut 76. Strut 76 may provide resistance to distortion and/or bending of the fan case 66 due to load 74 being imparted on inlet 64. Strut 76 may prevent or reduce a deflection of the fan case 66 relative to the engine central longitudinal axis X-X'. Stated differently, strut 76 may prevent or reduce a deflection of the fan case 66 such that a cross-section of the fan case 66, taken in a plane parallel to the r-axis, remains generally perpendicular engine central longitudinal axis X-X'. Strut 76 reducing deflection of fan case 66 may prevent or reduce a deflection of core 68 such that the central axis of engine case 36 may remain aligned with the central axis of the rotors disposed along core 68.

As shown in FIG. 2, in various embodiments, an aft engine mount 302 may be coupled to a top 110 of turbine exhaust case 72. The top 110 of turbine exhaust case 72 may be the portion of the turbine exhaust case 72 that is farthest from the ground surface when the turbofan engine 20 is coupled to an aircraft that is resting upon the ground surface. The top 110 of turbine exhaust case 72 is located generally opposite the bottom 78 (FIG. 1) of turbine exhaust case 72. A forward engine mount 304 may be coupled to a top 111 of the aft portion of fan case 66. The top 111 of fan case 66 is generally opposite the bottom 79 of fan case 66. Thrust struts 112 and 114 may extend between aft engine mount 302 and a forward portion of engine case 36. Forward engine mount 304 and aft engine mount 302 may mount turbofan engine 20 to a pylon or other engine support structure.

With reference to FIG. 3, a strut apparatus 300 coupled to fan case 66 and aft engine mount 302 is illustrated, according to various embodiments. Forward engine mount 304 may be coupled to fan case 66 and to a forward portion of a pylon 120. Aft engine mount 302 may be coupled to turbine exhaust case 72 and an aft portion of pylon 120. Turbofan engine 20 may be mounted to a wing of an aircraft via pylon 120.

In various embodiments, strut apparatus 300 may comprise a Y-shaped strut. For example, strut apparatus 300 may include a first portion 310 having a first end 312 coupled to bottom 79 of fan case 66. In various embodiments, the first end 312 of the strut apparatus 300 may be coupled to the fan case 66 via a pin joint to accommodate circumferential rotation of the fan case. Strut apparatus 300 may further include a second portion 314 and a third portion 316 extending from a second end 318 of first portion 310. Second portion 314 and third portion 316 may be located on opposite sides of turbine exhaust case 72.

Second portion 314 and third portion 316 may each be coupled to aft engine mount 302. Second portion 314 may be coupled to aft engine mount 302 via a fastener 322. Fastener 322 may comprise a pin, rivet, bolt, or other suitable securement mechanism. Fastener 322 may extend through an opening defined by second portion 314 and through an opening defined by a pair of flanges extending from aft engine mount 302. Third portion 316 may be coupled to aft engine mount 302 in a similar manner. For example, a pin, rivet, bolt, or other suitable securement mechanism may extend through an opening defined by third portion 316 and through an opening defined by a pair of flanges extending from aft engine mount 302. The securement mechanisms coupling second portion 314 and third portion 316 to aft engine mount 302 may be configured to accommodate rotation of fan case 66 and/or turbine exhaust case 72. Stated differently, second portion 314 may rotate about fastener 322 and third portion 316 may rotate about its fastener.

Figure 3A:
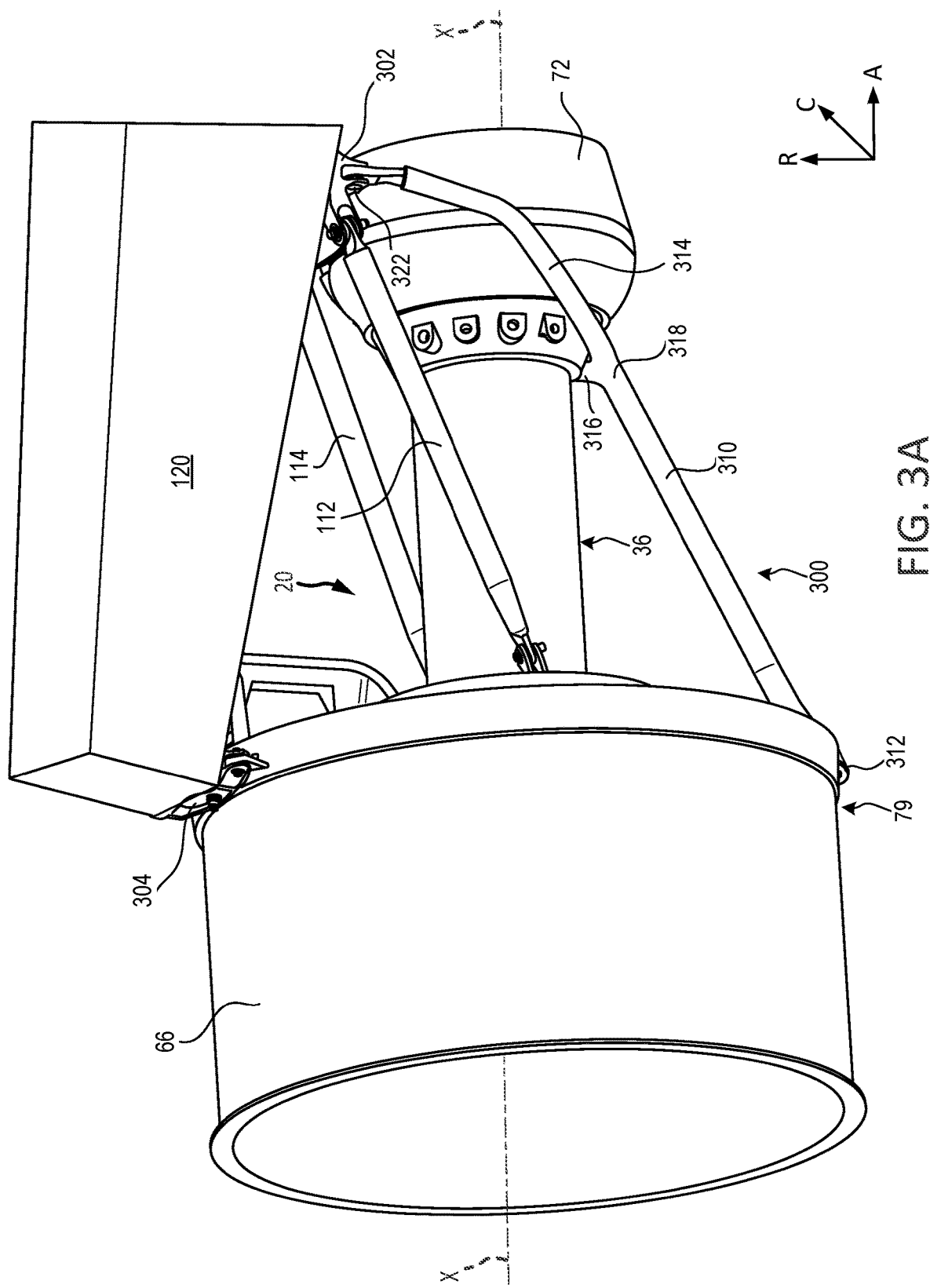
FIG. 3A illustrates a perspective view of a turbofan engine having a strut apparatus coupled to a fan case and an engine mount, in accordance with various embodiments.
Figure 3B:
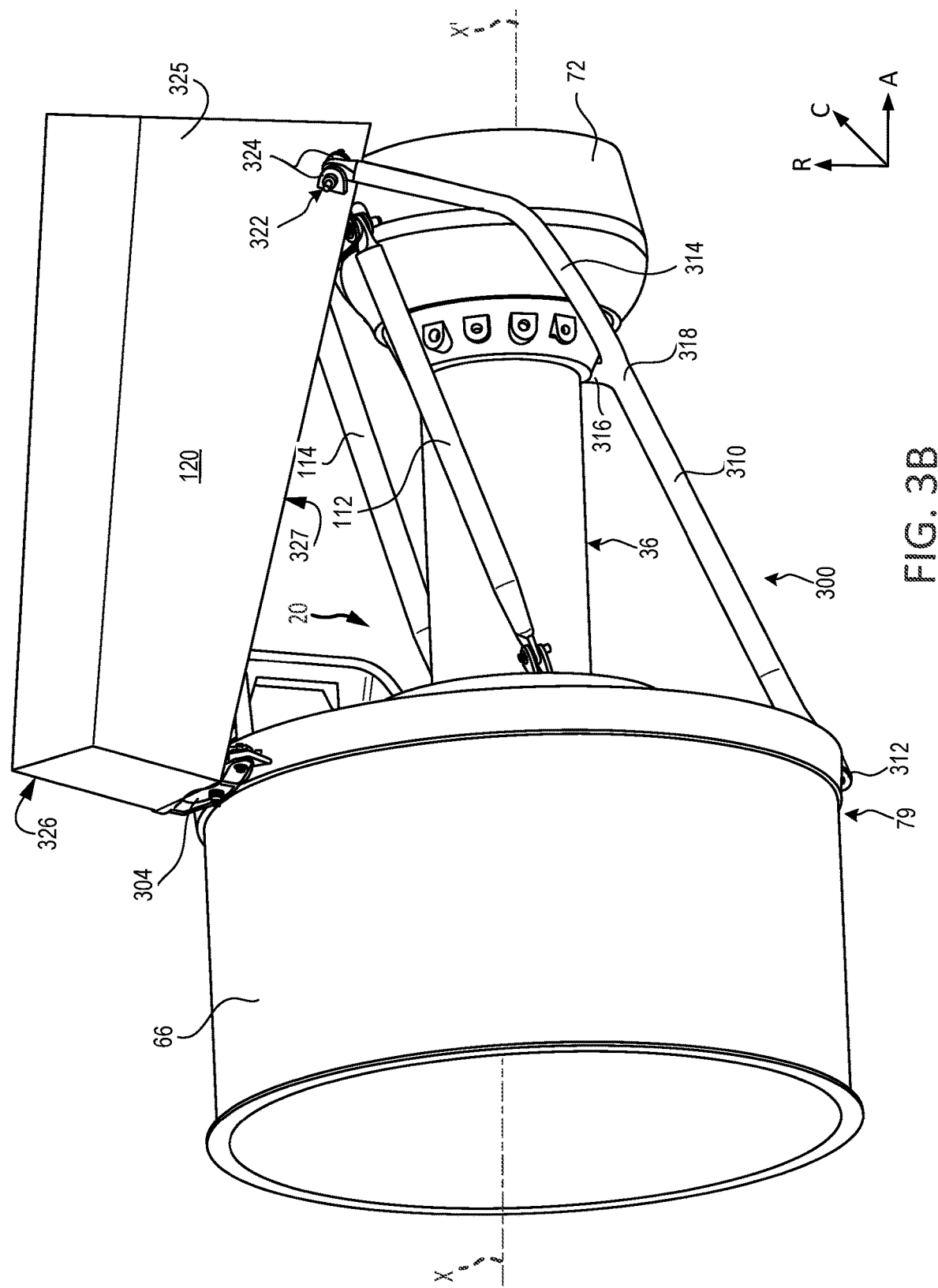
FIG. 3B illustrates a perspective view of a turbofan engine having a strut apparatus coupled to a fan case and a pylon, in accordance with various embodiments.

With reference to FIG. 3B, in various embodiments, second portion 314 and third portion 316 of strut apparatus 300 may be coupled to pylon 120 rather than to aft engine mount 302. For example, fastener 322 may extend through the opening defined by second portion 314 and through an opening defined by a first pair of flanges 324 extending from pylon 120, and a fastener, similar to fastener 322, may extend through the opening defined by third portion 316 and through an opening defined by a second pair of flanges, similar to flanges 324, extending from pylon 120. In various embodiments, the first pair of flanges 324 extend from an outboard side 325 of pylon 120 and the second pair of flanges extend from an inboard side 326 of pylon 120 that is opposite outboard side 325. In various embodiments, the first pair of flanges 324 and/or the second pair of flanges extend from a bottom side of 327 of pylon 120 that is proximate turbofan engine 20.

With combined reference to FIG. 1 and FIGS. 3A and 3B, strut apparatus 300 may reduce or prevent deflection of fan case 66, thereby resisting distortion of the centerline of core 68. For example, strut apparatus 300 may counteract the force applied to fan case 66 by inlet cowl 64 and load 74 by transferring the load to aft engine mount 302 and/or pylon 120. Strut apparatus 300 may thus prevent or reduce a deflection of the fan case 66 relative to center longitudinal axis X-X' of turbofan engine 20. Stated differently, strut apparatus 300 may prevent or reduce a deflection of the fan case 66 such that the radial plane of the fan case 66 (i.e., the cross-section of fan case 66 in a plane parallel to the r-axis) remains substantially perpendicular the engine central longitudinal axis X-X', as used herein "substantially perpendicular" means ±5 degrees. Strut apparatus 300 preventing or reducing deflection of fan case 66 tends to reduce or prevent a deflection of core 68 such that the central axis of engine case 36 may remain aligned with the central axis of the rotors disposed along core 68.

Figure 4:
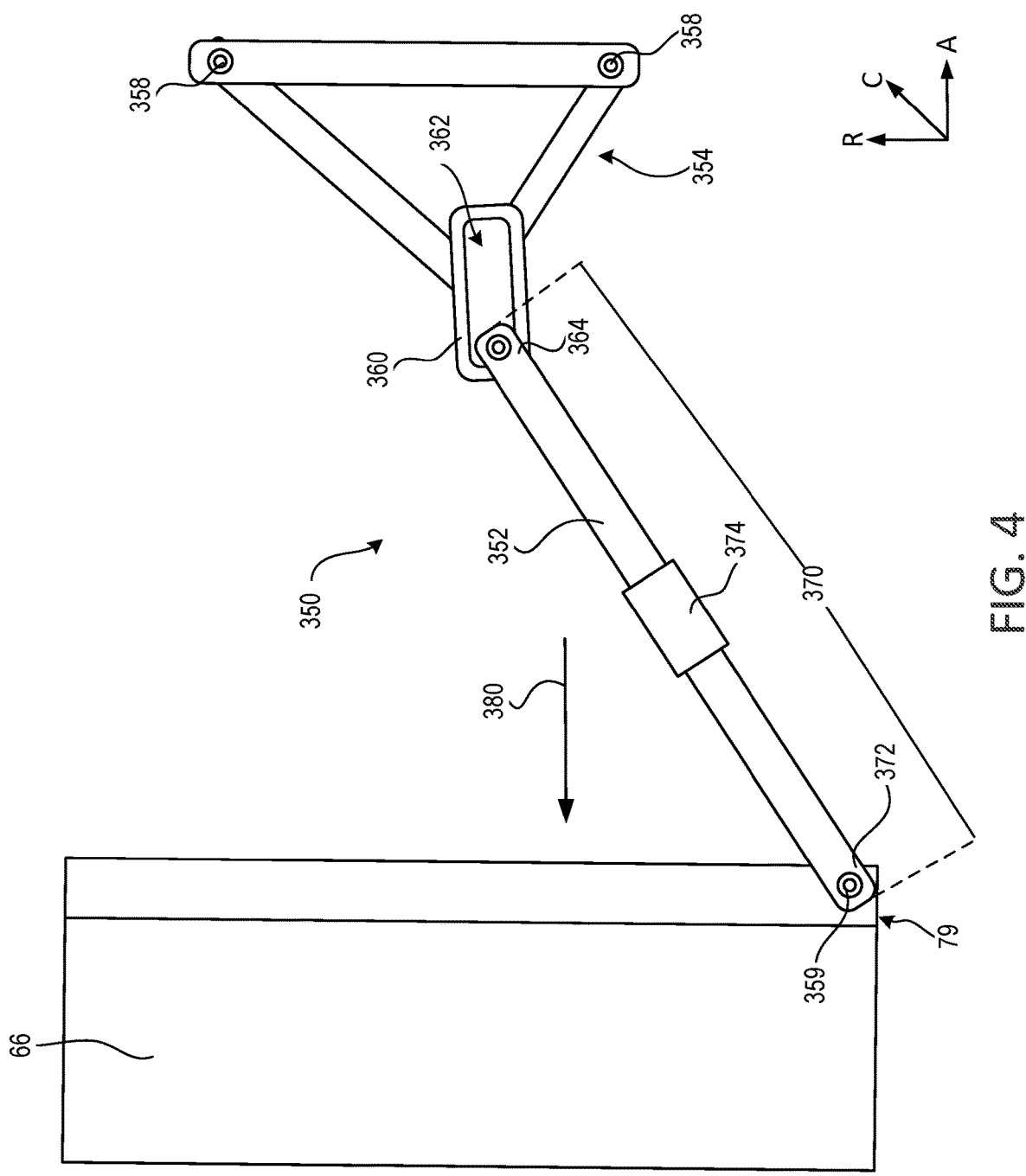
FIG. 4 illustrates a schematic of a strut apparatus coupled to a fan case of a turbofan engine, in accordance with various embodiments.

With reference to FIG. 4, a strut apparatus 350 coupled to fan case 66 and configured for attachment to an aft deflection resistant structure is illustrated, according to various embodiments. Strut apparatus 350 may include a strut 352 and a frame 354. Frame 354 may be coupled to a deflection resistant structure via fasteners 358. For example, frame 354 may be coupled to a pylon, an aft engine mount, a turbine exhaust case, or other structure aft of fan case 66 and capable of supporting strut 352 and countering the transfer of load 74 (FIG. 1) to fan case 66. Fasteners 358 may comprise pins, rivets, bolts, screws, or other suitable securement mechanism. A portion 360 of frame 354 may define an aperture or track 362. Strut 352 may be slidably coupled to frame 354. In that regard, a first end 364 of strut 352 may slide, or otherwise translate, forward and aft within track 362. For example, when the turbofan engine is operating at elevated temperatures, first end 364 of strut 352 may be located at a forward edge of track 362 due to the thermal expansion of various engine components. When the turbofan engine is operating at relatively low temperatures and/or during reverse thrust conditions (e.g., descent or landing), first end 364 of strut 352 may be located at the aft edge of track 362. In various embodiments, track 362 may be configured to allow first end 364 to slide between to 0.25 inches and 1.0 inches (i.e., between 0.64 cm and 2.54 cm). In various embodiments, track 362 may be configured to allow first end 364 to slide between to 0.4 inches and 0.6 inches (i.e., between 1.02 cm and 1.52 cm). Allowing strut 352 to slide within track 362 may reduce a likelihood of strut 352 imparting an undesired load on fan case 66. For example, during reverse thrust, strut 352 may slide aft which may tend to avoid strut 352 apply a forward load (i.e., a load in the direction of arrow 380) against fan case 66.

A second end 372 of strut 352, opposite the first end 364, may be coupled to fan case 66 via a pin joint 359 or other securement mechanism. Pin joint 359 may be configured to accommodate circumferential rotation of fan case 66. Strut 352 includes a length 370 extending from first end 364 of strut 352 to second end 372 of strut 352. In various embodiments, strut 352 may be adjustable in length. In various embodiments, strut 352 may include a length adjustment mechanism 374. Length adjustment mechanism 374 may allow length 370 of strut 352 to be adjusted. Length adjustment mechanism 374 may comprise a turnbuckle, threaded coupling, or other adjustable linkage. Length adjustment mechanism 374 may allow length 370 of strut 352 to be adjusted manually either before or after attachment of strut apparatus 350 to the turbofan engine. Length 370 of strut 352 may be adjusted to accommodate changing engine operating conditions and/or to customize strut apparatus 350 to the slight tolerance variations which may exist between engines. Altering length 370 of strut 352 may compensate for thermal expansion of, for example, fan case 66, engine case 36, turbine exhaust case 72, aft engine mount 302, strut 352, and/or frame 354.

Figure 5:
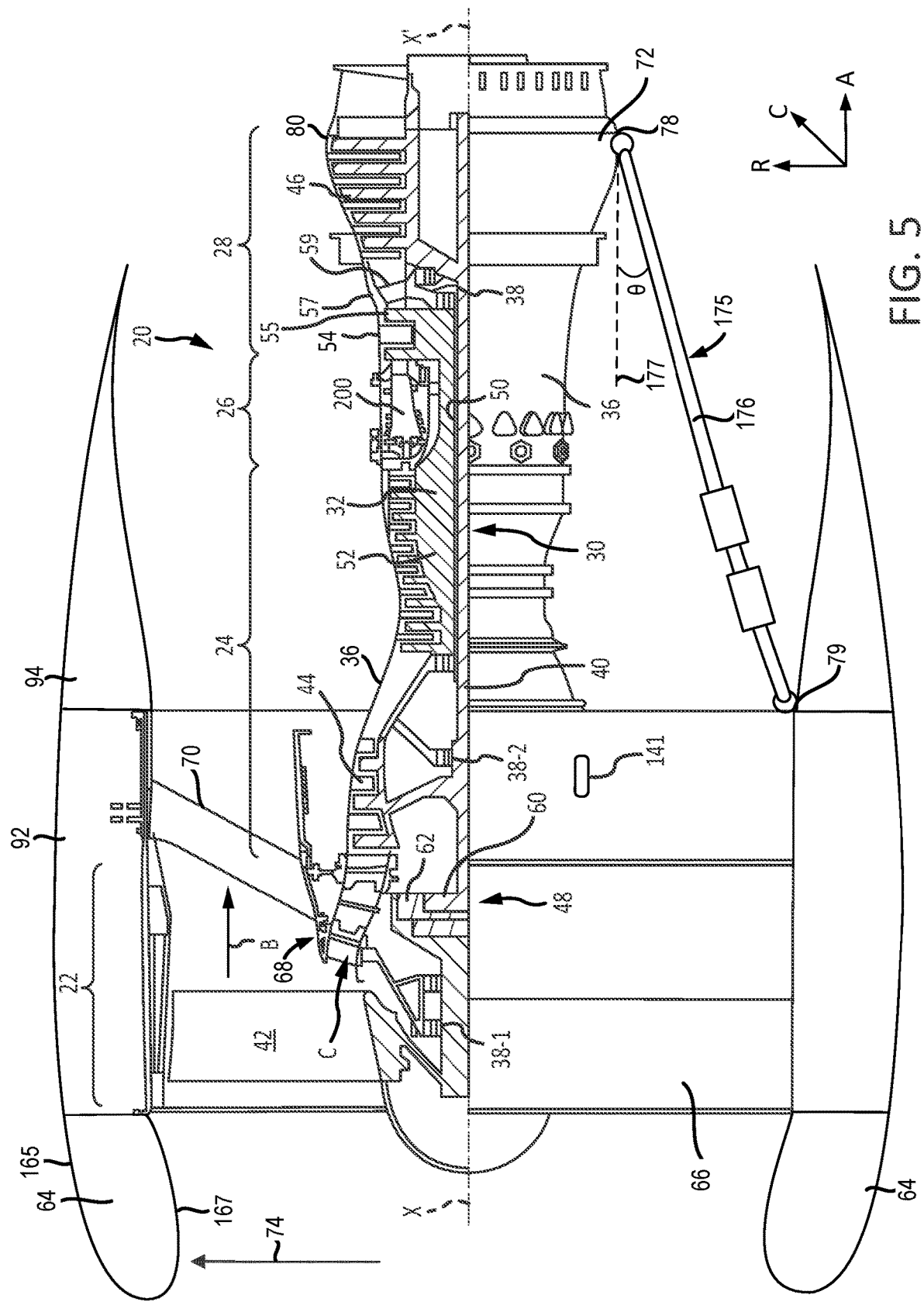
FIG. 5 illustrates a schematic cross-section of a turbofan engine having an adjustable strut apparatus mounted thereto, in accordance with various embodiments.

With reference to FIG. 5, a strut apparatus 175 comprising an electrically controlled strut 176 is illustrated, according to various embodiments. Strut 176 may be coupled to fan case 66 and turbine exhaust case 72. In various embodiments, strut 176 may be located proximate bottom 78 of turbine exhaust case 72 and bottom 79 fan case 66. Strut 176 may receive a control signal and may have a variable length that is adjusted based on the control signal. In particular, the control signal may control the length of strut 176 in order to resist distortion of the centerline of core 68 from both the bending of the core originating from the forward thrust load of the fan relative to its support bearing at 38-1 or the inlet bending load 74, which tends to arise during operating conditions (e.g., take-off and climb) that generate a large low pressure region at an upper, radially outward surface 164 of inlet 64 and a high pressure region at an upper, radially inward surface 167 of the inlet 64.

The degree of the strut's countering action to resist the deflecting load from entering the core 68 may be regulated by compensating for thermal expansion of engine case 36 and/or of strut 176. For example, strut 176 may counteract the force applied to the core 68 via transfer of load 74 through fan exit guide vane 70 by holding the aft radial plane of the fan case 66 perpendicular to the central engine longitudinal axis X-X' such that a right triangle may be formed by central engine longitudinal axis X-X', the aft radial plane of the fan case 66, and strut 176, wherein strut 176 forms the hypotenuse of the right triangle. The portions of engine case 36 extending along compressor section 24, combustor section 26, and turbine section 28 may have varying axial lengths as their cold build dimensions and axial lengths are increasing and decreasing as engine power conditions change. Fan case 66 and strut 176 may also change in axial length. Strut 176 being configured to change length may allow strut 176 to counter the thrust load and the inlet load 74 and compensate for the various thermal expansions and varying axial lengths, such that the aft radial plane of the fan case 66 remains perpendicular to the central engine longitudinal axis X-X' and distortion of core 68 is reduced. In various embodiments, sections of strut 176 may be actuated hydraulically such that the electronic signals may open control valves that control actuation flows to the strut that expand the strut 176 or reduce a length of the strut 176 according to the need to control the perpendicularity of the fan case 66 relative to the engine core 68. In various embodiments, position sensors may be utilized to determine a position of the sections of strut 176.

Strut 176 may prevent or reduce the deflection of the fan case 66 relative to the centerline of the rotors along core 68 such that the radial plane of the fan case 66 remains essentially perpendicular the centerline of rotors along core 68. Strut 176 may thus prevent or reduce a likelihood that the centerline of engine case 36 will deflect away from the centerline of the rotors of core 68 due to engine thrust loads and/or inlet load 74.

Figure 6:
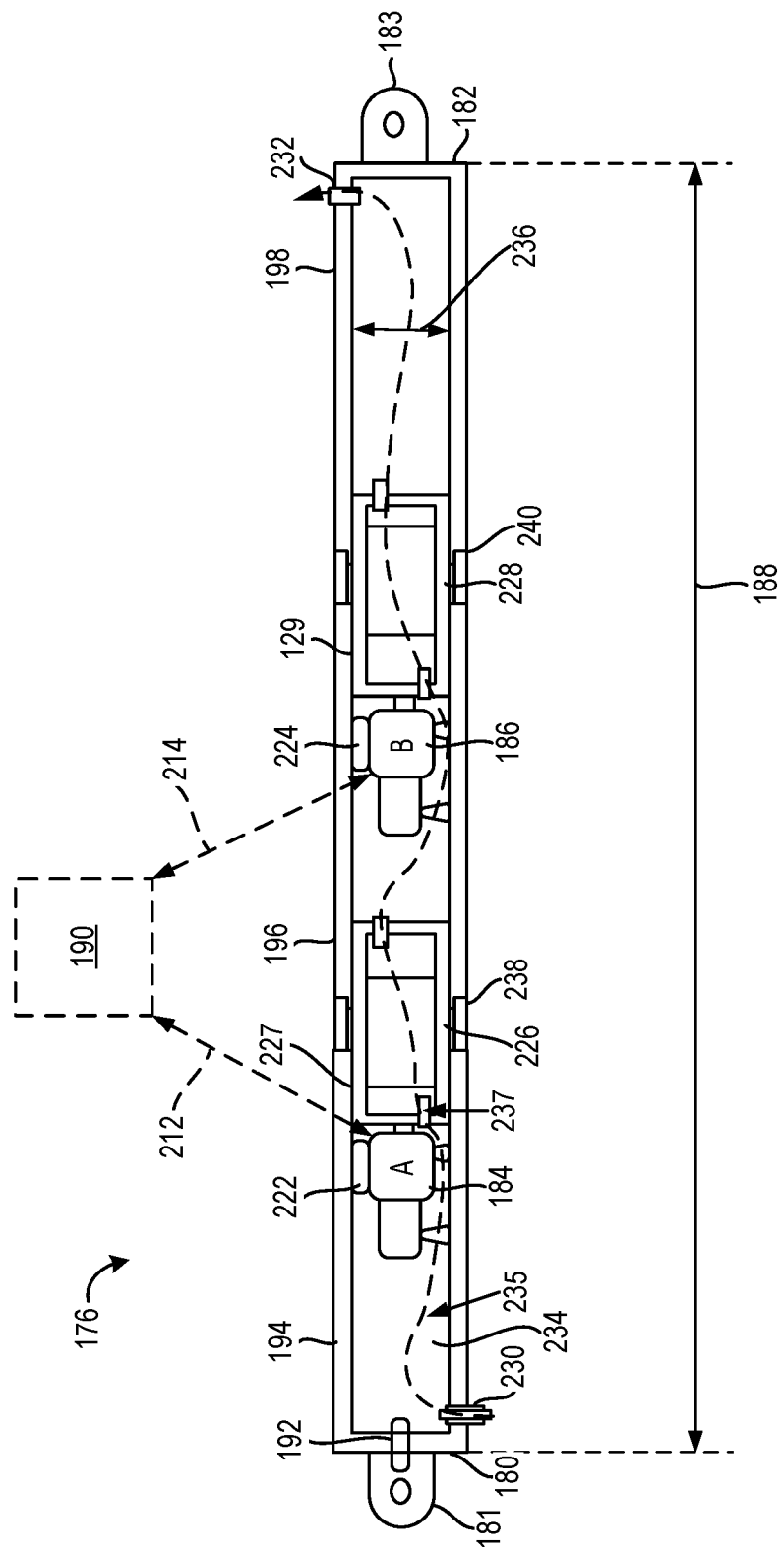
FIG. 6 illustrates a cross-sectional view of an adjustable strut apparatus for use with a turbofan engine, in accordance with various embodiments.

With reference to FIG. 6, various features of strut 176 will be described with more detail. In particular, strut 176 may have a first end 180 and a second end 182. In various embodiments, first end 180 may be coupled to fan case 66 or turbine exhaust case 72, and second end 182 may be coupled to the other of fan case 66 or turbine exhaust case 72. Strut 176 may include a lug 181 located at first end 180. Lug 181 may be used to couple first end 180 to fan case 66 or turbine exhaust case 72. Likewise, strut 176 may include a mounting bracket 183 located at second end 182. Mounting bracket 183 may be used to couple second end 182 to the other of fan case 66 or turbine exhaust case 72.

In various embodiments, strut 176 may include load measuring capabilities to determine whether strut 176 is accurately tracking the expansion of engine case 36, within a relatively small tolerance. In various embodiments, the load determination may be accomplished by purposefully thinning a portion of lug 181 and applying one or more strain gauges 192 to the thinned portion and calibrating the instrumentation. Strain gauge 192 may determine a load applied by strut 176 to fan case 66 and the turbine exhaust case 72, with momentary reference to FIG. 5.

Strut 176 may include a first actuator 184 and a second actuator 186. First actuator 184 and second actuator 186 may comprise any type of actuator that is electronically controllable. For example, first actuator 184 and second actuator 186 may include an electrical actuator, a hydraulic actuator, a pneumatic actuator, a fueldraulic actuator, or the like. In the case of a fueldraulic actuator, pressurized fuel from the engine system may be used as the motive force. In various embodiments, first actuator 184 and second actuator 186 may include an electrical motor. In various embodiments, the electrical motor may have a turning ratio that is between 1 to 1 and 12,000 to 1. In various embodiments, the electrical motor may have a turning ratio that is between 8,000 to 1 and 12,000 to 1, or about 10,000 to 1. Where used in this context, "about" may refer to the stated value±10 percent of the stated value.

One or both of first actuator 184 and second actuator 186 may be used to adjust a strut length 188 of strut 176. For example, first actuator 184 and second actuator 186 may receive control signals from a component, such as an electronic engine control 190. Although the description describes such control as being performed by electronic engine control 190, the control may be performed by any other electronic component. For example, actuators 184 and 186 may include an electric motor that is powered to turn clockwise and counter-clockwise based on solenoids or high powered electronics located away from strut 76, which may provide electricity to control actuators 184 and 186 to rotate clockwise, counter-clockwise, and/or to not rotate. In various embodiments, first actuator 184 and second actuator 186 may receive control signals from a dedicated computer for controlling the strut's extension and contraction in response to at least one engine parameter and/or from data inputs from strut 176 itself.

In various embodiments, first actuator 184 may receive a first control signal 212 and second actuator 186 may receive a second control signal 214. Control signals 212 and 214 may include a digital control signal, or may include alternating current (AC) or direct current (DC) electricity. Receipt of the AC or DC may cause actuators 184 and 186 to increase or decrease in length.

In various embodiments, actuators 184 and 186 may comprise hydraulic actuators. In this regard, control signals 212, and 214 may include an actuation flow. In response to receiving the actuation flow, actuators 184 and 186 may increase or decrease in length.

In response to both first actuator 184 and second actuator 186 functioning properly (i.e., being non-faulty), first actuator 184 and second actuator 186 may operate concurrently to adjust strut length 188 to a desired length. For example, if the desired length is an increase of 0.4 inches (1.0 cm) to the current strut length 188, first actuator 184 may increase the strut length by 0.2 inches (0.5 cm) and second actuator 186 may increase strut length by 0.2 inches (0.5 cm).

In various embodiments, each of first actuator 184 and second actuator 186 may increase the length of strut 176 by different amounts. For example, first actuator 184 may increase the strut length by 0.1 inches (0.3 cm) and second actuator 186 may increase the strut length by 0.3 inches (0.8 cm).

Electronic engine control 190 may be capable of determining whether first actuator 184 and second actuator 186 are functioning properly (i.e., the sections of strut 176 are moving in the direction and magnitude required by the current engine power setting). For example, strut 176 may include a first position sensor 222 and a second position sensor 224 that are each electronically coupled to electronic engine control 190. First position sensor 222 may be coupled to first actuator 184 and may determine whether first actuator 184 is functioning properly. Likewise, second position sensor 224 may be coupled to second actuator 186 and may determine whether second actuator 186 is functioning properly. For example, if electronic engine control 190 requests first actuator 184 to increase the strut length by 0.2 inches (0.5 cm) and first position sensor 222 detects only 0.1 inches (0.3 cm) of movement then electronic engine control 190 may determine that the first actuator 184 is faulty.

In response to first actuator 184 being faulty, electronic engine control 190 may control second actuator 186 to operate alone to increase strut length 188 to the desired length. Likewise, in response to second actuator 186 being faulty, electronic engine control 190 may control first actuator 184 to operate alone to increase strut length 188 to the desired length. For example, if the desired length is an increase of 0.4 inches (1.0 cm), first actuator 184 or second actuator 186 alone may increase the strut length by 0.4 inches (1.0 cm) in response to the other of first actuator 184 or second actuator 186 being faulty.

Strut 176 may include multiple stationery portions including a first portion 194, a second portion 196, and a third portion 198. Portions 194, 196, and 198 may be referred to as stationery because they fail to rotate relative to each other. Strut 176 may further include a plurality of turning sections including a first turning section 226 and a second turning section 228.

First turning section 226 may be coupled to one or both of first portion 194 and/or second portion 196 via a first threading 227. In that regard, first actuator 184 may rotate first turning section 226 relative to one or both of first portion 194 and/or second portion 196. In response to rotation of first turning section 226, first turning section 226 may move first portion 194 nearer to, or farther from, second portion 196 based on the direction of rotation. Likewise, second turning section 228 may be coupled to one or both of second portion 196 and/or third portion 198 via a second threading 229. In that regard, second actuator 186 may rotate second turning section 228 relative to one or both of second portion 196 and/or third portion 198. In response to rotation of second turning section 228, second turning section 228 may move second portion 196 nearer to, or farther from, third portion 198 based on the direction of rotation.

First position sensor 222 may be coupled to at least one of first portion 194, second portion 196, or first turning section 226. First position sensor 222 may detect a position of first portion 194 relative to second portion 196. In that regard, first position sensor 222 may provide feedback to electronic engine control 190 indicating whether first actuator 184 has increased or decreased the distance from first portion 194 to second portion 196 by the requested amount. If first position sensor 222 indicates that the change in distance from first portion 194 to second portion 196 is different than the requested amount, then electronic engine control 190 may determine that first actuator 184 is faulty. Second position sensor 224 and may function in a similar manner as first position sensor 222 with regard to second portion 196, third portion 198, and second turning section 228. Similarly, the data detected by first position sensor 222 and second position sensor 224 may be used by electronic engine control 190 to determine the length 188 of strut 176.

Strut 176 may have a cavity 234 defined therein. Cavity 234 may extend from first end 100 to second end 182 and may include cavities 235 defined within each of first portion 194, second portion 196, and third portion 198. Cavity 234 may further include a plurality of passageways 237 extending through first turning section 226 and second turning section 228.

Strut 176 may include a first fan 230 positioned proximate to first end 100. First fan 230 may draw air into cavity 234 from the surrounding environment. First fan 230 drawing air into cavity 234 may provide an environment conducive to long term durability of the motor and increased reliability of sensors. The air may pass through cavity 234 where the air may be received at a second fan 232 at second end 182. Second fan 232 may draw the air through cavity 234 and blow the air out of cavity 234 and into the environment.

Cavity 234 may have a width 236. In various embodiments, width 236 may be between 2.0 inches and 5.0 inches (5.1 cm and 12.7 cm), between 3 inches and 4 inches (7.6 cm and 10.2 cm), or about 3.5 inches (8.9 cm). Where used in this context, "about" may refer to the stated value±10 percent of the stated value.

Strut 176 may include a first anti-rotation feature 238 coupled to first portion 194 and second portion 196. First anti-rotation feature 238 may include, for example, a piece of material connected to first portion 194 and second portion 196 that prevents rotation of first portion 194 relative to second portion 196. Likewise, strut 176 may include a second anti-rotation feature 240 coupled to second portion 196 and third portion 198. Second anti-rotation feature 240 may include, for example, a piece of material connected to second portion 196 and third portion 198 that prevents rotation of second portion 196 relative to third portion 198.

Electronic engine control 190 may control first actuator 184 and second actuator 186 to adjust strut length 188 based on various pieces of information. For example and with momentary combined reference to FIG. 5 and FIG. 6, electronic engine control 190 may control first actuator 184 and second actuator 186 based on an engine temperature within core 68 (e.g. a temperature detected at an aft end of compressor section 24 also referred to as a T3 engine temperature), an engine speed (e.g., an engine speed detected at high pressure compressor 52 also referred to as an N2 engine speed), or the like. Each of the measurements may allow the current temperature measurement to be correlated with a synthesized overall casing temperature and thus the correct engine core length.

Strut 176 may be formed from any of a variety of materials. For example, strut 176 may include a metal such as aluminum, titanium, alloys thereof, etc. As another example, strut 176 may include a composite material such as a carbon fiber reinforced polymer, a glass reinforced plastic, or the like.

Figure 7:
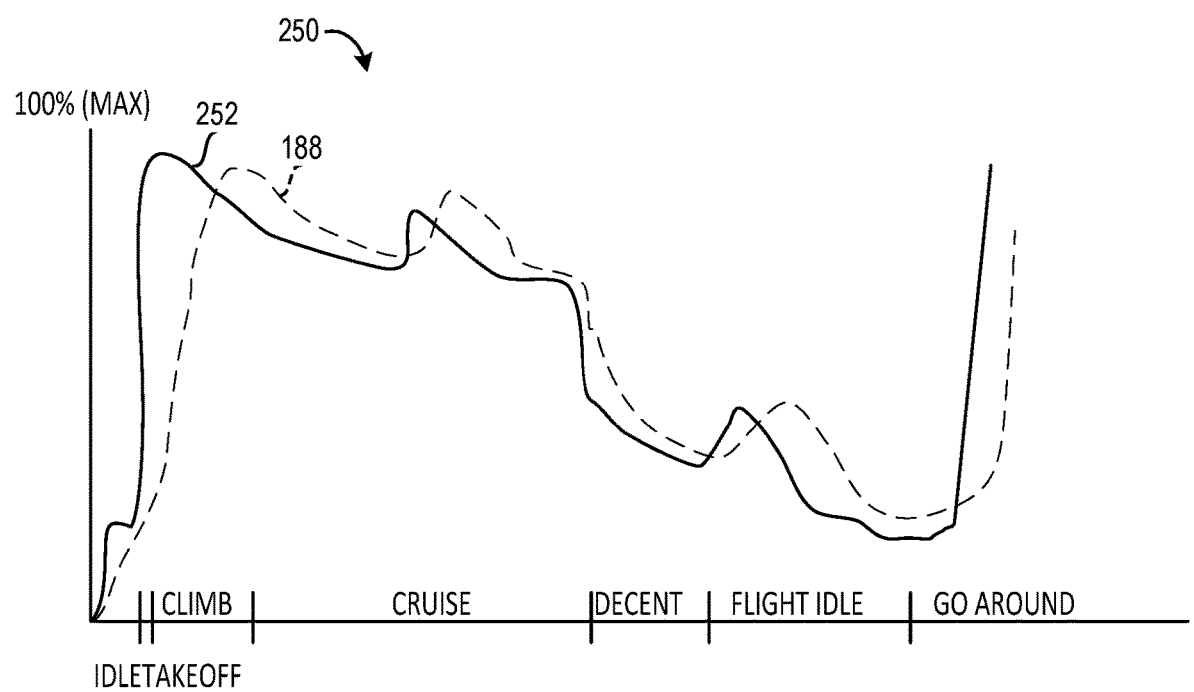
FIG. 7 illustrates a chart showing a response time of the strut of FIG. 6, in accordance with various embodiments.

FIG. 7 shows a plot 250 illustrating results of a model showing strut length 188 response compared to the N2 engine speed 252. With reference to FIGS. 5 and 7, the N2 engine speed 252 may correspond directly to thermal expansion of engine case 36 with a time lag that can be estimated and then empirically corrected to a relatively high accuracy. In plot 250, strut length 188 is depicted as mirroring the thermal expansion of engine case 36 multiplied by a constant modifying factor, wherein the constant modifying factor is equal to the cosine of an angle theta (θ) formed by strut 176 and an axial plane 177 parallel to engine central longitudinal axis X-X'.

Figure 8:
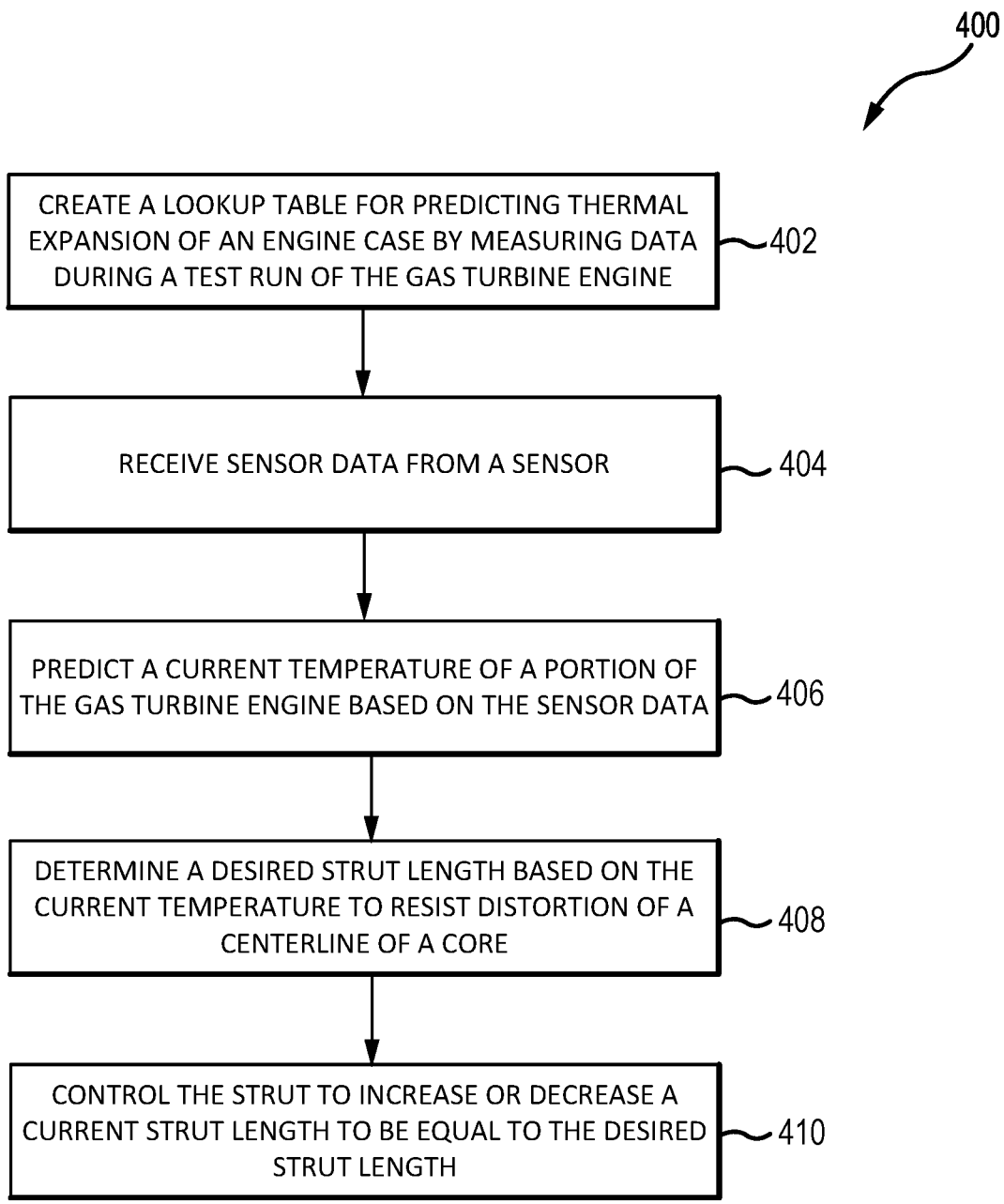
FIG. 8 illustrates a flowchart for a method for controlling a strut to reduce distortion of a centerline of a core of a turbofan engine, in accordance with various embodiments.

Referring now to FIG. 8, a method 400 for controlling a strut length of a strut, such as strut 176 of FIG. 6, is shown. Method 400 may be performed by a controller that is coupled to the strut, such as electronic engine control 190 of FIG. 6. Method 400 may be applied to a strut that includes 2 actuators, such as strut 176 of FIG. 6, or a strut that includes one actuator. Method 400 may be performed to resist distortion of the centerline of a core of a turbofan engine due to thermal influences.

In block 402, one or more lookup tables may be created for measuring the temperature and temperature response rates and ultimately calculating the expansion of various engine case areas as a function of time. The test data may also include the thermal response step power changes and the power level history before that step power change. In various embodiments, one or more equations may be created instead of, or in addition to, the lookup table.

In particular and referring to FIG. 5, during operation of engine 20, one or more sensor(s) 141 may be positioned on the turbofan engine 20 or the strut 176 to detect data output from turbofan engine 20. For example, the sensor(s) 141 may detect at least one of a compressor section discharge, a T3 engine temperature, an N2 engine speed, strut length 188, and/or the load being applied to fan case 66 by strut 176. Turbofan engine 20 may be controlled to switch between each operational state, such as between idle and take off, between take off and climb, between climb and cruise, between cruise and descent, between descent and flight idle, and the like.

As turbofan engine 20 switches between operational states, the sensor 141 may detect the corresponding speed, temperature, and/or strut length 188 as a function of time. The data detected by the sensor 141 may be used to synthesize the case expansion so the length of the strut may be adjusted to counter the thrust load and inlet load to maintain the perpendicular angle formed by the aft radial plane of fan case 66 and engine central longitudinal axis X-X'. The measured data may indicate the rate and amount of expansion of engine case 36 as turbofan engine 20 is controlled to operate in a new operational state. The lookup tables and/or the equations may represent the expansion of engine case 36 as a function of the elapsed time since turbofan engine 20 switched to a new engine operational state.

During operation of turbofan engine 20, strut length 188 may be controlled to resist thrust loads and inlet air loads that tend to lead to distortion of the centerline of core 68 as the turbofan engine 20 changes operational states.

The lookup tables or equations may then be supplemented to include desired strut lengths that will resist distortion of a centerline of the core of the turbofan engine. For example, calculations may be performed to determine strut lengths that will resist the deformation of the centerline of the core 68 as turbofan engine 20 changes operational states. The desired strut lengths may vary over time based on time since a change between operational states. In various embodiments, the desired strut lengths may continuously or periodically increase or decrease for a predetermined amount of time after turbofan engine 20 switches to a new operational state. For example, the desired strut length may increase by 0.12 inches (0.30 cm) per second for 90 seconds after the engine has switched from an idle state to a takeoff state.

The lookup tables and/or equations may be created using a controller onboard the turbofan engine or by a controller that is remote from the turbofan engine. For example, the data may be collected from one or more sensor positioned on the turbofan engine and provided to a remote device, such as a remote computer. The remote computer may utilize the measured data to create the lookup tables or equations.

Returning to FIG. 8, in block 406 the controller may predict a current temperature of a portion of the turbofan engine based on the measured sensor data. For example, the predicted temperature may correspond to a particular location along the engine case of the turbofan engine. In some embodiments, the temperature itself may be measured by the sensor and utilized in place of the predicted temperature such that the prediction is unnecessary.

In block 408, a desired strut length may be determined based on the current predicted temperature. The desired strut length may correspond to a strut length that causes the strut to resist distortion of a centerline of a core of the turbofan engine. Stated differently, in response to the strut length being set to the desired strut length, the strut may apply a force to the engine case to resist distortion of the centerline of the core.

The desired strut length may be determined based on various information. For example, the information may include one or more of the current operational state of the engine, a rate and amplitude of expansion of the engine case, or an amount of elapsed time since the engine switched to the current operational state. This information may be applied to the lookup tables or the equations that were created in block 402. The lookup tables or equations may output the desired strut length based on the received information.

For example, in response to the turbofan engine switching to a new operational state, the new operational state and the current temperature may be applied to the lookup tables or the equations. The output of the lookup tables or equations may include one or more rate(s) of expansion or contraction of the strut length over a predetermined amount of time. For example, in response to the turbofan engine switching from an idle state to a takeoff state, the lookup tables or equations may output data indicating that the strut length is to increase by 0.12 inches (0.30 cm) per second for 90 seconds after the turbofan engine has switched from the idle state to the takeoff state.

In block 410, the controller may control the strut to increase or decrease the current strut length to be equal to the desired strut length. Continuing the above example, the controller may control actuators of the strut to increase the strut length by 0.12 inches (0.30 cm) per second for 90 seconds after the turbofan engine switches to the takeoff state.

Figure 9:
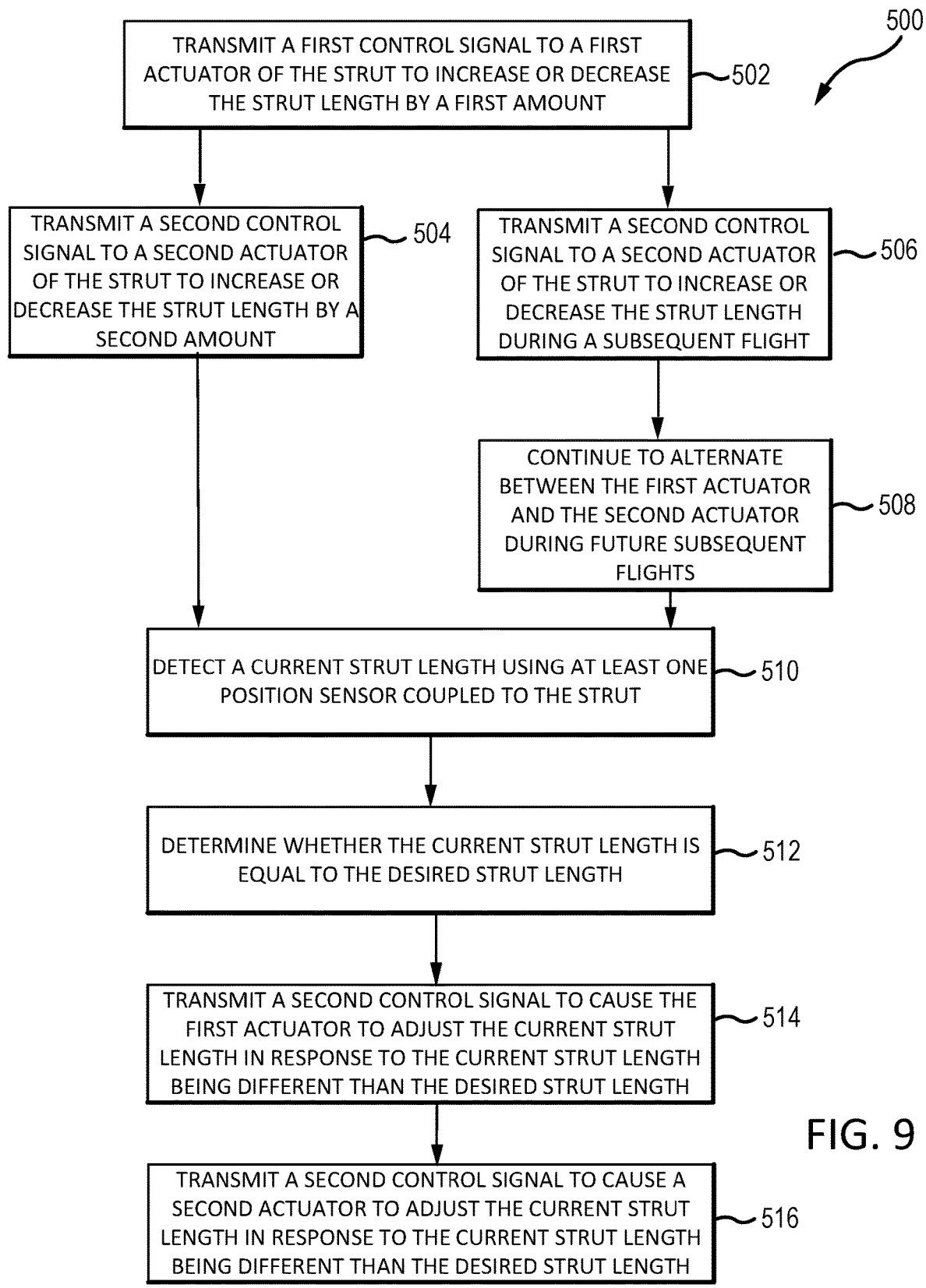
FIG. 9 illustrates a flowchart for a method for controlling a strut to increase or decrease a current strut length to be equal to a desired strut length, in accordance with various embodiments.

Referring to FIG. 9, a method 500 is shown for controlling the strut to increase or decrease the current strut length to be equal to the desired strut length. The method 500 may be performed by a controller (e.g., electronic engine control 190) that is coupled to the strut. The method 500 may be performed by the same controller or a different controller than utilized in method 400 of FIG. 8. Method 500 may be applied to a strut that includes 2 actuators, such as strut 176 of FIG. 6. In various embodiments, it is desirable to have at least two control signals transmitted to the strut to provide redundancy.

In block 502, the controller may transmit a first control signal to a first actuator of the strut. The first control signal may control the first actuator to increase or decrease the strut length by a first desired amount. In various embodiments, the first control signal may control the first actuator to increase or decrease the strut length at a certain rate over a predetermined amount of time. For example, the control signal may control the actuator to increase the strut length by 0.12 inches (0.30 cm) per second for 90 seconds.

The first desired amount may correspond to the desired strut length that was determined in block 408 of FIG. 8. For example, the first desired amount may correspond to the entire change of the strut length from a current strut length to the desired strut length. As another example, the first desired amount may correspond to a portion of the entire change of the strut length. In that regard, the remainder of the entire change of the strut length may be actuated by a second actuator.

Blocks 504, 506, and 508 may be performed if the strut includes 2 actuators. In various embodiments, blocks 506 and 508 may function as alternatives to block 504. For example, one controller may implement the method 500 using block 504 and not blocks 506 and 508, while another controller may implement the method 500 using blocks 506 and 508 and not block 504.

Block 504 may correspond to various embodiments in which each of the first actuator and the second actuator is controlled to change the strut length by a portion of the entire desired change of strut length. In that regard, in block 504, a second control signal may be a transmitted to a second actuator of the strut to increase or decrease the strut length by a second amount. The second amount may correspond to the difference between the first amount that is actuated by the first actuator and the entire change of the strut length.

Block 506 may correspond to various embodiments in which the first actuator actuates all changes of the strut length for a first flight of the turbofan engine and the second actuator actuates all changes of the strut length for a second flight of the turbofan engine. In that regard and in block 506, the controller may transmit a second control signal to a second actuator of the strut to increase or decrease the strut length during a subsequent flight. This may be desirable as the condition of each actuator may be determined during every other flight. For example, during a first flight, the first actuator will be used and the controller will be capable of determining if the first actuator is operating properly (i.e., adjusting the strut length by the desired amount), and during a second flight, the second actuator will be used and the controller will be capable of determining if the second actuator is operating properly. If one actuator is determined to be faulty (i.e., not operating properly) then a maintenance flag may be set to repair the faulty actuator and the other actuator may be utilized until a repair of the faulty actuator is complete.

In block 508, the controller may continue to alternate between the first actuator actuating the strut length and the second actuator actuating the strut length during future subsequent flights. For example, the first actuator may control the strut length during a first flight, the second actuator may control the strut length during a second flight subsequent to the first flight, the first actuator may again control the strut length during a third flight subsequent to the second flight, the second actuator may again control the strut length during a fourth flight subsequent to the third flight, and so forth.

In block 510, the controller may receive a detected strut length using at least one position sensor that is coupled to the strut. For example, with momentary reference to FIG. 6, one or both of first position sensor 222 and/or second position sensor 224 may detect strut length 188 of strut 176.

Returning to FIG. 9, in block 512, the controller may compare the detected strut length to the desired strut length. This comparison may indicate whether one or both of the actuators is operating properly. In that regard, when the desired strut length is equal to the current strut length, then the controller may infer that the one or more actuator that is currently actuating the strut is operating properly. If the one or more actuator is operating properly, then the method 500 may end in block 512. Otherwise, the method 500 may proceed to block 514.

In block 514, if the current strut length is different than the desired strut length, then the controller may transmit a second control signal to the first actuator to adjust the current strut length. The second control signal may be transmitted to the first actuator via a different control channel than the first control signal. In that regard, if the first control channel is faulty then the control signal may be received by the first actuator via the second control channel. In response to the first control channel being determined to be faulty, a maintenance flag may be set to repair the first control channel.

In block 516, if the current strut length is different than the desired strut length, then the controller may transmit a second control signal to cause a second actuator of the strut to adjust the current strut length. In that regard, if the first actuator is faulty then the second actuator may function in place of the first actuator. In response to the first actuator being determined to be faulty, a maintenance flag may be set to repair the first actuator.

In various embodiments, block 516 may be performed in response to determining that the current strut length is different than the desired strut length after transmitting the first control signal to the first actuator. In various embodiments, block 516 may be performed in response to determining that the current strut length is different than the desired strut length after transmitting the second control signal to the first actuator.

In various embodiments and with reference to FIG. 5, the centerline of the core 68 may become distorted due to mechanical forces. For example, as turbofan engine 20 is changed from an idle operational state to a takeoff operational state, fan 42 may apply a forward axial force. This forward axial force may be transferred to engine case 36 via fan exit guide vane 70. This transferred force may distort the centerline of core 68. Such distortion may occur at a predetermined amount of time after turbofan engine 20 switches to the takeoff state. For example, this distortion may occur between 4 seconds and 8 seconds, such as 6 seconds, after turbofan engine 20 switches to the takeoff state.

As another example, as turbofan engine 20 begins its initial ascent, aerodynamic load 74 may be applied to inlet 64 due to the aircraft being set into a high angle of attack at its initial takeoff rotation. Load 74 may transfer through fan case 66 and fan exit guide vane 70 to engine case 36. This transferred wind load 74 may distort the centerline of the core 68.

The duration of time after the aircraft switches from the takeoff state, wherein the aircraft is traveling straight down the runway, to the takeoff rotation, wherein the aircraft begins its initial climb, may be known or measurable. In that regard, the time at which load 74 is generated and applied to inlet 64 may also be know or measurable. For example, load 74 may be applied between 30 seconds and 1 minute after turbofan engine 20 switches to the takeoff state, such as 45 seconds after the switch to the takeoff state. Stated differently, load 74 may be applied to inlet 64 as the aircraft begins its ascent (i.e., begins its initial climb), which may occur between 30 seconds and 1 minute after the aircraft begins to accelerated down the runway.

Strut 176 may be controlled to apply an predetermined amount of pre-load to the fan case 66 to resist such aerodynamically-driven distortion before the distortion occur, as most flights tend to follow a known sequence of events (e.g., idle, acceleration to reach takeoff power/speed, ascent/takeoff rotation, cruise, descent, etc.)

Figure 10:
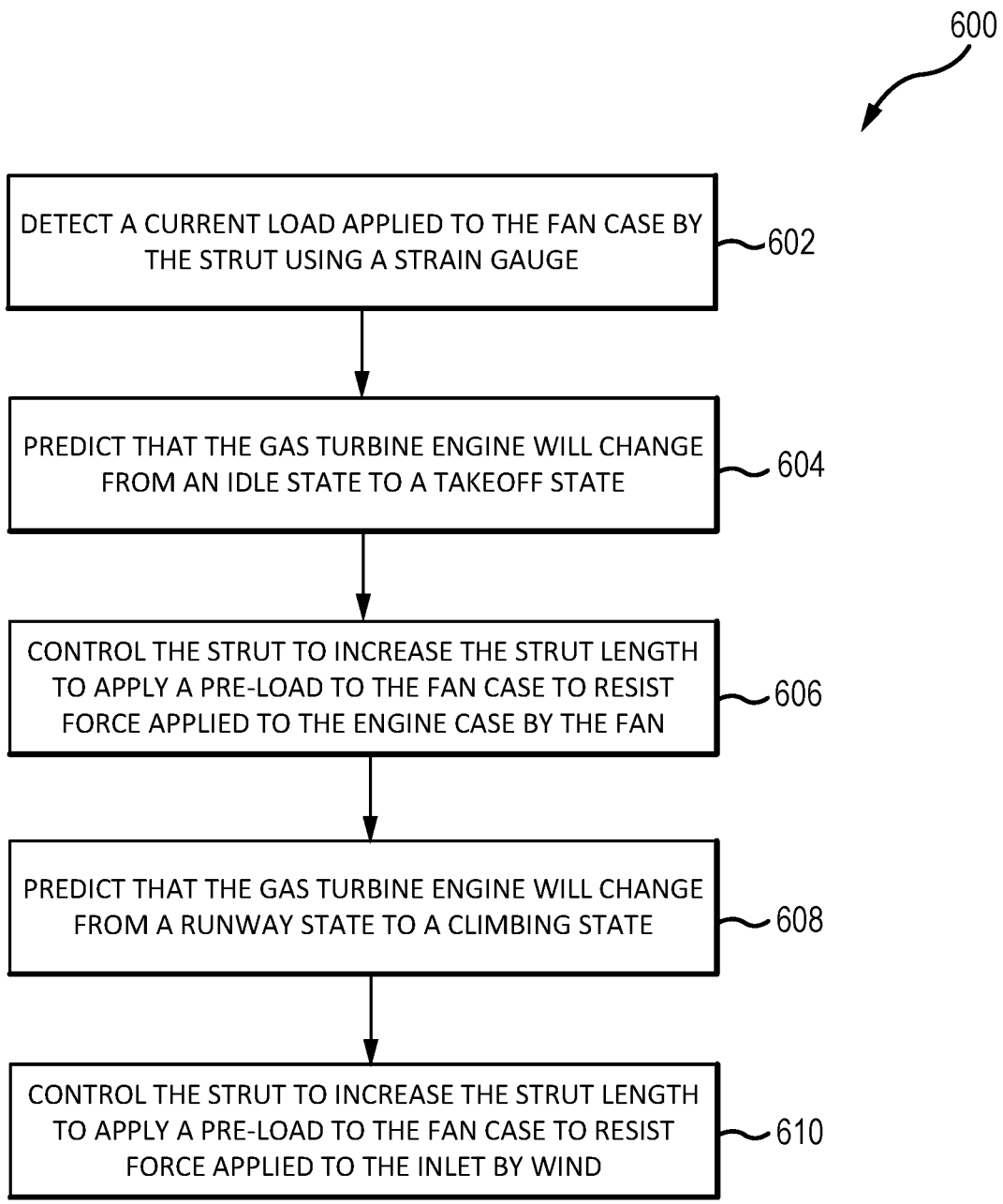
FIG. 10 illustrates a flowchart for a method for controlling a strut to apply a pre-load to a fan case of a turbofan engine to reduce distortion of a centerline of a core due to mechanically-induced loads, in accordance with various embodiments.

Referring to FIG. 10, a method 600 may be applied by a controller (e.g., electronic engine control 190 of FIG. 6) for controlling a strut to apply a pre-load to resist distortion of the engine core. In block 602, a strain gauge of the strut may detect a current load that is applied to the fan case and the engine case of the turbofan engine by the strut. The current load may be increased or decreased by altering the strut length. Altering the strut length may allow a precise pre-load to be imparted on the fan case. Applying a precise pre-load to the fan case may allow the fan case to more effectively resist distortion and/or compensate for manufacturing and assembly variations between engines.

In block 604, the controller may predict that the turbofan engine will change from an idle state to a takeoff state. For example, this prediction may be made in response to determining that the aircraft has begun to taxi towards a runway for takeoff. As another example, this prediction may be made in response to determining that the aircraft has reached the starting location of the runway.

In block 606, the controller may control the strut, such as by controlling one or more actuators, to decrease the strut length to apply a pre-load to the fan case to resist force applied to the engine case by the fan, as described above. In that regard, the pre-load may resist distortion of the centerline of the core of the turbofan engine.

In various embodiments, the magnitude of the pre-load may be predetermined. For example, it may be desirable for the pre-load to be 2000 pound-force (8900 Newtons). In that regard, the controller may continue to adjust the strut length until the strain gauge indicates that the force applied to the fan case is about 2000 pound force. Where used in this context, "about" refers to the stated value plus or minus a predetermined percentage, such as 20%.

In block 608, the controller may predict that the turbofan engine will change from a takeoff state (in which the turbofan engine has not begun ascending) to a climbing state (in which the turbofan engine is ascending) and thereby further increase the bending forces on the engine. In various embodiments, the controller may predict that this change will occur after a predetermined amount of time expires from the turbofan engine switching from a takeoff state to an ascending state (also referred to as a "climbing" state). For example, the controller may predict that the turbofan engine will change from the takeoff state to the climbing state after 45 seconds has elapsed since the turbofan engine switched from the idle state to the takeoff state. In various embodiments, the controller may predict that this change will occur in response to determining that the yoke of the corresponding aircraft has been pulled back, corresponding to a control for the aircraft to lift off.

In block 610, the controller may control the strut to decrease the strut length to apply a pre-load to the fan case to resist force applied to the inlet by load 74 (FIG. 5), as described above. In that regard, the pre-load applied to the fan case via the strut may resist distortion of the centerline of the core of the turbofan engine.

In various embodiments, the pre-load applied in block 610 may be greater than the pre-load applied in block 606. For example, it may be desirable for the pre-load applied in block 610 to be 3000 pound force (13,300 Newtons). In that regard, the controller may control one or more actuator of the strut to increase the strut length until the strain gauge measures 3000 pound force (13,300 Newtons) applied to the fan case.

Figure 11:
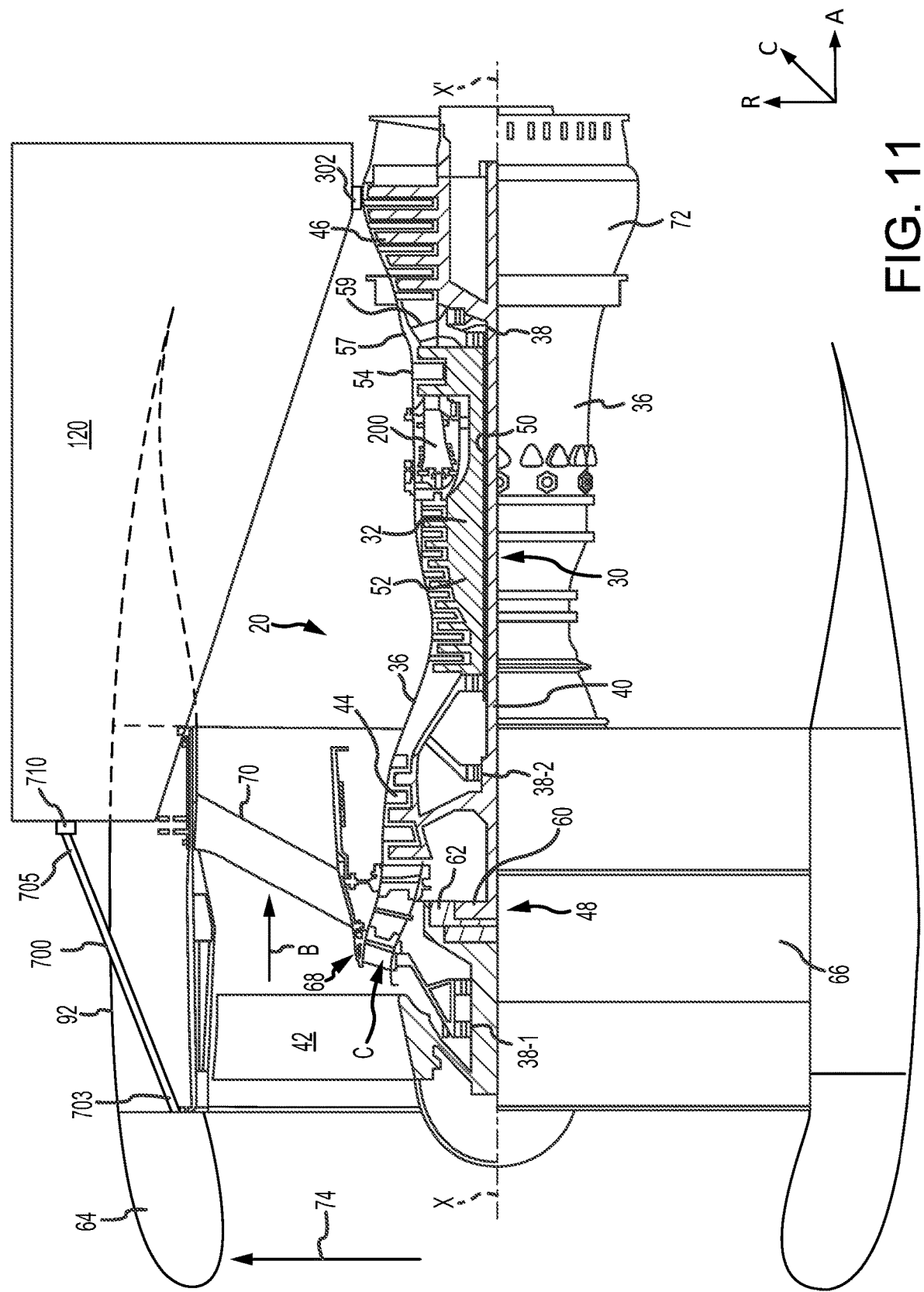
FIG. 11 illustrates a schematic cross-section of a turbofan engine having a strut coupled to a fan case and a pylon, in accordance with various embodiments.

With reference to FIG. 11, a strut apparatus 700 for reducing deflection of fan case 66 and engine core 68 of turbofan engine 20 is illustrated, according to various embodiments. A forward portion 703 of strut apparatus 700 may be located proximate the interface of inlet 64 and fan case 66. Stated differently, forward portion 703 of strut apparatus 700 may be located proximate the area where inlet 64 is coupled to fan case 66. An aft portion 705 of strut apparatus 700 may be coupled to pylon 120 via an attachment bracket 706 or other suitable securement mechanism.

Figure 12:
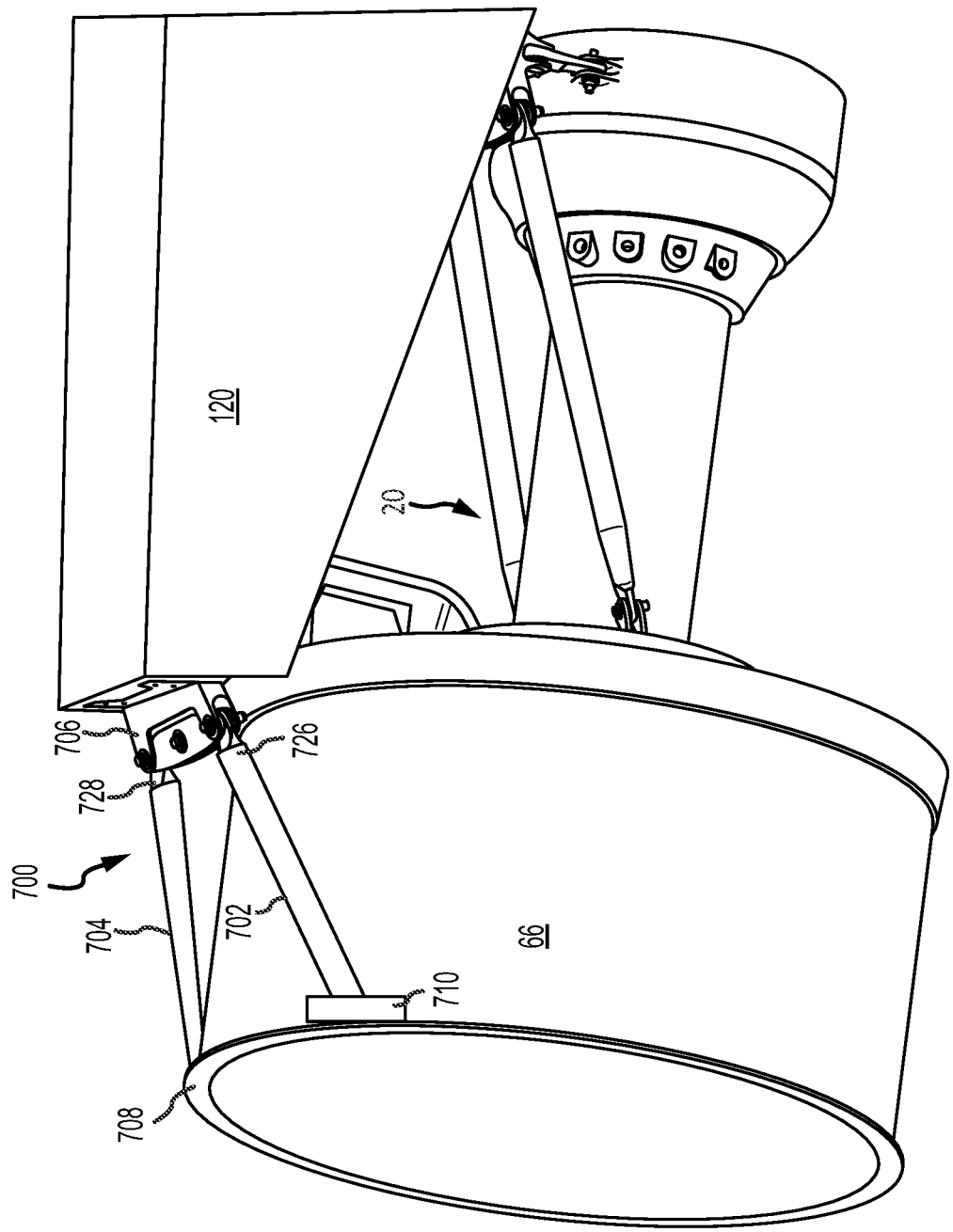
FIG. 12 illustrates a perspective view of the strut apparatus of FIG. 11, in accordance with various embodiments.
Figure 13:
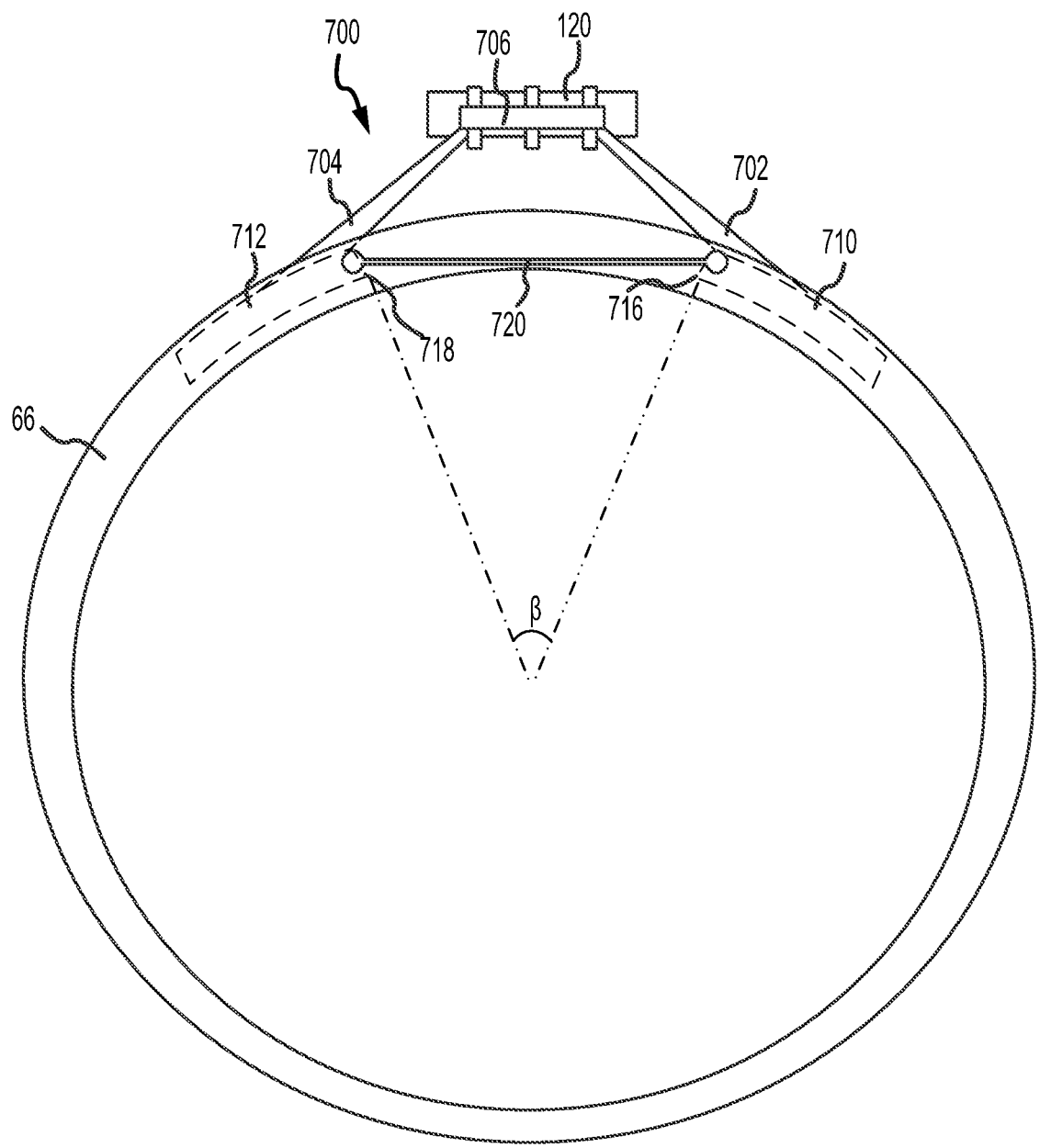
FIG. 13 illustrates a schematic view looking forward to aft of the strut apparatus of FIG. 11, in accordance with various embodiments.

With reference to FIGS. 12 and 13 various features of strut apparatus 700 will be described with more detail. In particular, strut apparatus 700 may include a first strut 702 and a second strut 704. A first end 710 of first strut 702 and a first end 712 of second strut 704 may each be located proximate the aft side of a flange 708 of fan case 66. Flange 708 may be located at a forward end of fan case 66. A second end 726 of first strut 702 may be coupled to pylon 120 via a bracket 706. A second end 728 of second strut 704 may be coupled to pylon 120 via bracket 706. Bracket 706 may be configured to combine and/or balance the loads applied to first strut 702 and second strut 704 such that a single load is applied to pylon 120. In various embodiments, bracket 706 may comprise a whiffletree. Attaching struts 702 and 704 via a whiffletree may allow a single, centralized load to be applied to pylon 120.

Referring to FIG. 13, first strut 702 and second strut 704 may be configured such that a surface 716 of first end 710 is oriented circumferentially toward a surface 718 of first end 712. First strut 702 and second strut 704 may be configured such that surface 716 and surface 718 form an angle beta ($\beta$), as measured along the circumference of fan case 66. In various embodiments, angle $\beta$ may be between 15 degrees and 90 degrees. In various embodiments, angle $\beta$ may be between 20 degrees and 45 degrees. A tension bar 720 (also referred to as a tie rod) may be coupled between first strut 702 and second strut 704. Tension bar 720 may maintain first strut 702 and second strut 704 at angle $\beta$.

While first strut 702 and second strut 704 are each illustrated as unibody members having a fixed length, it should be understand that first strut 702 and/or second 704 may comprise struts which are adjustable in a length. For example, in various embodiments, first strut 702 and second strut 704 may comprise a length adjusting mechanism, similar to length adjusting mechanism 374 in FIG. 4. In various embodiments, struts 702 and 704 may comprise one or more actuators, similar to actuators 184 and 186 in FIG. 6.

Figure 14:
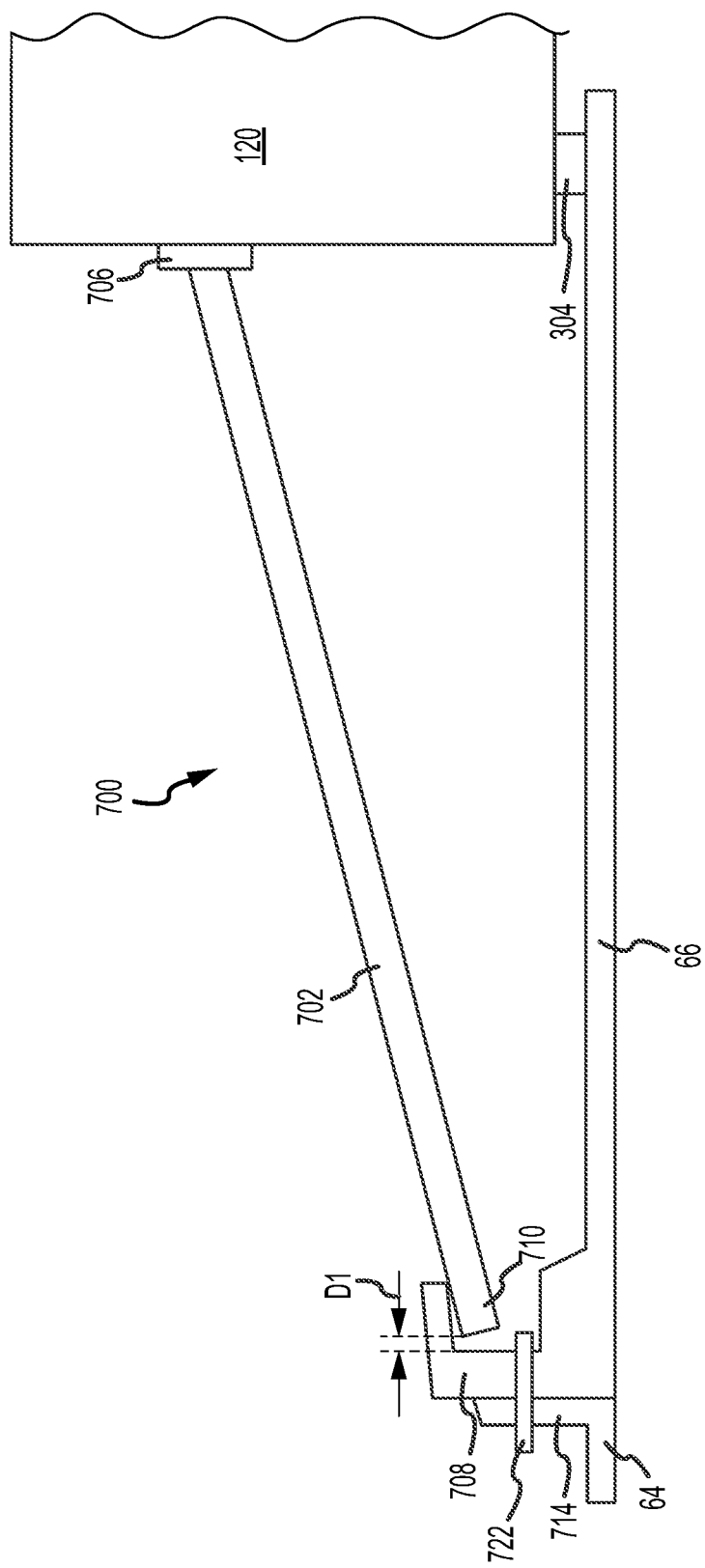
FIG. 14 illustrates a schematic of the strut apparatus of FIG. 11, in accordance with various embodiments.

With reference to FIG. 13 and FIG. 14, first end 710 of first strut 702 may be located a distance D1 from the aft side of a fan case flange 708. Similarly, first end 712 of second strut 704 may be located distance D1 from the aft side of fan case flange 708. Fan case flange 708 may be located proximate a flange 714 of inlet 64. In various embodiments, fan case 66 may be attached to inlet 64 via a fastener 722 located through fan case flange 708 and inlet flange 714. Fastener 722 may comprise a pin, rivet, bolt, screw, or other suitable securement mechanism.

In various embodiments, distance D1 may be between 0.05 inches and 1.0 inches (i.e. between 0.13 cm and 2.54 cm). In various embodiments, distance D1 may be between 0.1 inches and 0.5 inches (i.e. between 0.254 cm and 1.27 cm). Distance D1 may be selected to allow for thermal expansion of fan case 66, inlet 64, first strut 702 and/or second strut 704.

With reference to FIG. 11 and FIG. 14, distance D1 may be selected to decrease or minimize occurrences of core 68 bending. In that regard, bending or distortion of fan case 66 up to distance D1 tends to have little or no effect on tip clearances along core 68. When fan case 66 experiences bending or distortion greater than distance D1, tip clearances along core 68 and performance of engine 20 tend to be adversely affected. Accordingly, strut apparatus 700 is configured to prevent fan case 66 from distorting more than distance D1. For example, when load 74 is applied to inlet 64, fan case 66 may bend or distort such that fan case 66 translates distance D1. Once fan case 66 has translated distance D1, fan case 66 contacts first strut 702 and/or second strut 704. First strut 702 and second strut 704 are coupled to, and supported by, pylon 120. First strut 702 and second strut 704 are thus able to counter load 74 and prevent fan case 66 from distorting beyond distance D1. Strut apparatus 700 preventing fan case 66 from distorting beyond distance D1 may decrease or prevent distortion of core 68, thereby decreasing occurrences of rub events and flow leakage to increase performance of engine 20.

Figure 15:
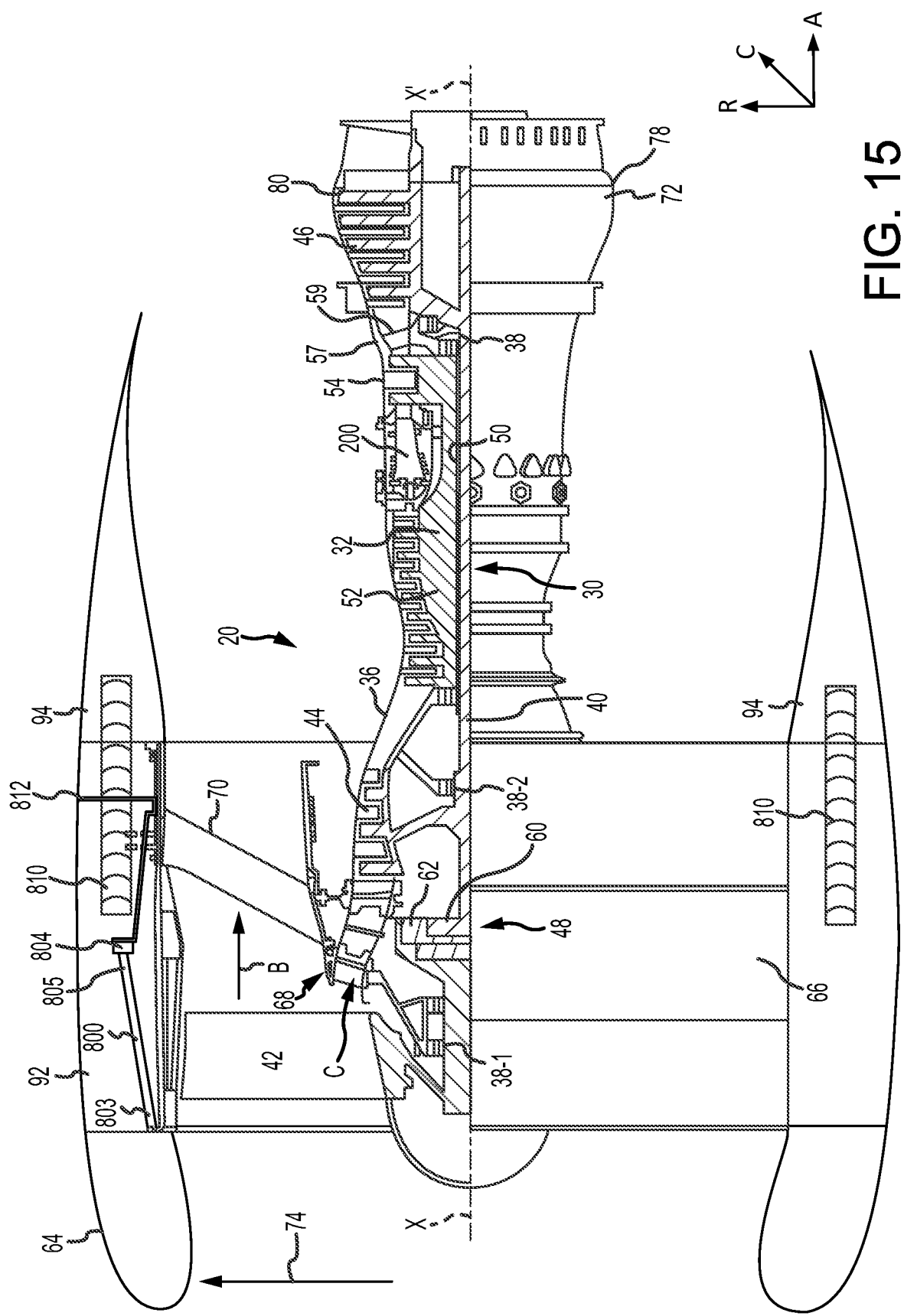
FIG. 15 illustrates a schematic cross-section of a turbofan engine having a strut apparatus coupled to a fan case and a thrust reverser support, in accordance with various embodiments.
Figure 16:
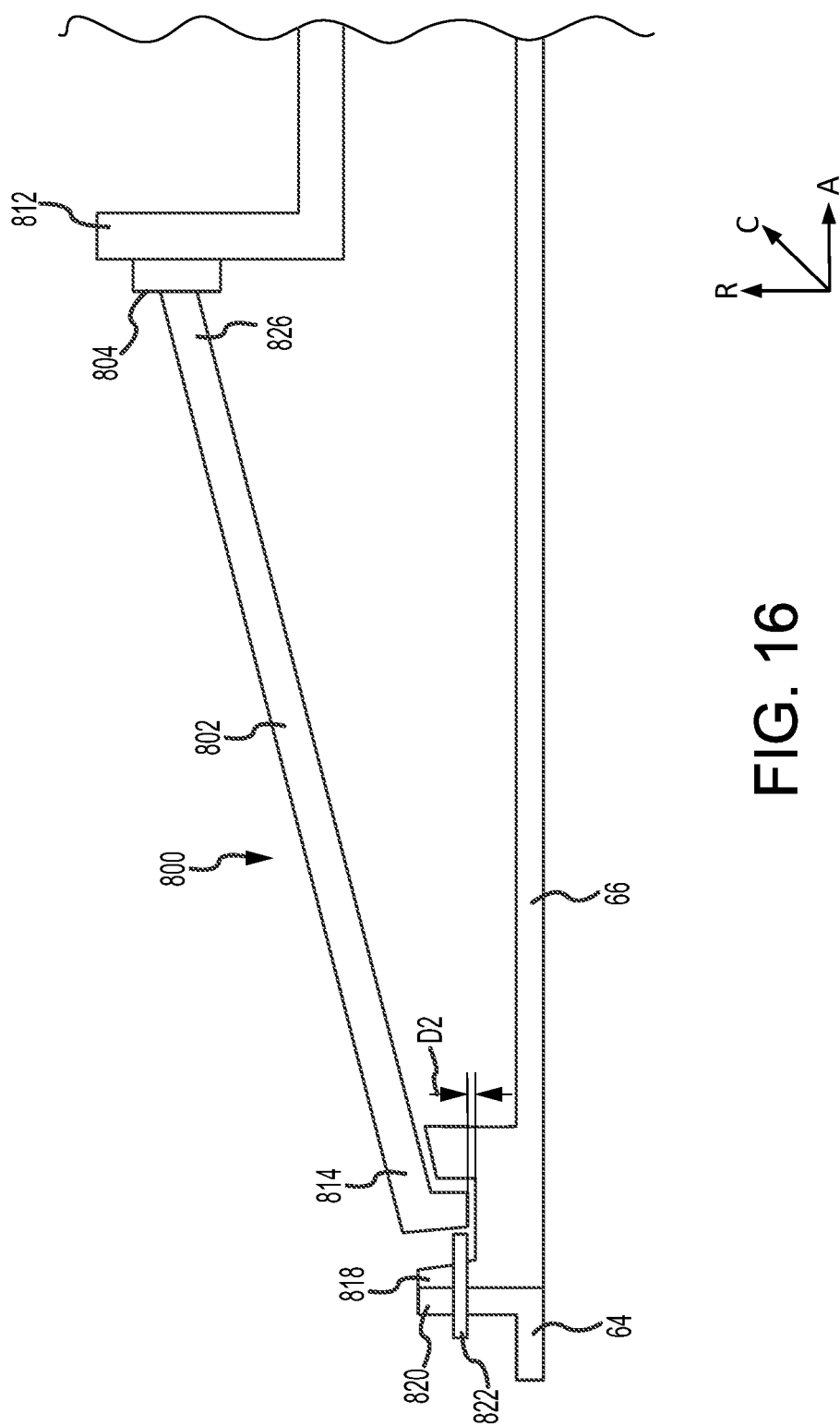
FIG. 16 illustrates a schematic of the strut apparatus of FIG. 15, in accordance with various embodiments.

With reference to FIGS. 15 and 16, a strut apparatus 800 for limiting deflection of fan case 66 and core 68 of turbofan engine 20 is illustrated, in accordance with various embodiments. A forward portion 803 of strut apparatus 800 may be located proximate the interface of inlet 64 and fan case 66. An aft portion 805 of strut apparatus 800 may be coupled to a thrust reverser support 812 via an attachment bracket 804 or other suitable securement mechanism. Thrust reverser support 812 may support cascades 810 of thrust reverser 94.

Strut apparatus 800 may include a first strut 802. In various embodiments, strut apparatus 800 may also include a second strut, similar to second strut 704 in FIG. 12. A first end 814 of first strut 802 and may be located proximate an aft side of a flange 818 of fan case 66. Fan case flange 818 may be located proximate a flange 820 of inlet 64. In various embodiments, fan case 66 may be attached to inlet 64 via a fastener 822 located through fan case flange 818 and inlet flange 820. Fastener 822 may comprise a pin, rivet, bolt, screw, or other suitable securement mechanism. A second end 826 of first strut 802 may be coupled to thrust reverser support 812 via bracket 804. In various embodiments, bracket 804 may comprise a whiffletree.

First end 814 of first strut 802 may be located radially outward from fan case 66. First end 814 of first strut 802 may be located distance D2 from fan case 66. In various embodiments, distance D2 may be between 0.05 inches and 1.0 inches (i.e. between 0.13 cm and 2.54 cm). In various embodiments, distance D2 may be between 0.1 inches and 0.5 inches (i.e. between 0.254 cm and 1.27 cm) (i.e. between cm and cm).

Distance D2 may be selected to allow for thermal expansion of fan case 66, inlet 64, and/or strut 802. Distance D2 may be selected to decrease or minimize occurrences of core 68 bending. In that regard, fan case 66 may bend or distort up to distance D2 without affecting tip clearances along core 68. When fan case 66 experiences bending or distortion greater than distance D2 tip clearances along core 68 and performance of engine 20 may be adversely affected. Accordingly, strut apparatus 800 is configured to prevent fan case 66 from distorting more than distance D2. For example, when load 74 is applied at inlet 64 and fan case 66 has translated distance D2, fan case 66 may contact first strut 802. First strut 802 is coupled to, and supported by, thrust reverser support 812. First strut 802 is thus able to counter load 74 and prevent fan case 66 from distorting beyond distance D2. Strut apparatus 800 preventing fan case 66 from distorting beyond distance D2 may decrease or prevent distortion of core 68, thereby decreasing occurrences of rub events and flow leakage and increasing performance of engine 20.

While strut 802 is illustrated as unibody member having a fixed length, it should be understand that strut 802 may comprise an adjustable strut (i.e., a strut in which a length of the strut can be adjusted). For example, in various embodiments, strut 802 may comprise a length adjusting mechanism, similar to length adjusting mechanism 374 in FIG. 4. In various embodiments, strut 802 may comprise one or more actuators, similar to actuators 184 and 186 in FIG. 6.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling a strut coupled to a fan case of a turbofan engine, comprising:
   receiving, from a sensor, sensor data usable to predict a temperature of a portion of the turbofan engine;
   predicting, by a controller, a current predicted temperature of the portion of the turbofan engine based on the sensor data; and
   controlling, by the controller, the strut to at least one of increase or decrease a strut length of the strut based on the current predicted temperature to reduce distortion of a centerline of a core of the turbofan engine.

2. The method of claim 1, wherein the sensor comprises at least one of a temperature sensor configured to detect a current temperature of the portion of the turbofan engine or another portion of the turbofan engine or a speed sensor configured to detect a current speed of a compressor section or a turbine section of the turbofan engine.

3. The method of claim 1, wherein controlling the strut to at least one of increase or decrease the strut length includes transmitting a first control signal to a first actuator of the strut to cause the first actuator to at least one of increase or decrease the strut length.

4. The method of claim 3, wherein controlling the strut to at least one of increase or decrease the strut length further includes:
   detecting, by a position sensor of the strut, a current strut length of the strut; and
   transmitting a second control signal to the first actuator of the strut to cause the first actuator to at least one of increase or decrease the strut length in response to the current strut length of the strut being different than a desired strut length of the strut.

5. The method of claim 3, wherein controlling the strut to at least one of increase or decrease the strut length further includes:
   detecting, by a position sensor of the strut, a current strut length of the strut; and
   transmitting a second control signal to a second actuator of the strut to cause the second actuator to at least one of increase or decrease the strut length in response to the current strut length of the strut being different than a desired strut length of the strut.

6. The method of claim 1, wherein controlling the strut to at least one of increase or decrease the strut length further includes:
   transmitting a first control signal to a first actuator of the strut to cause the first actuator to at least one of increase or decrease the strut length by a first amount; and
   transmitting a second control signal to a second actuator of the strut to cause the second actuator to at least one of increase or decrease the strut length by a second amount, the first amount and the second amount each being greater than zero.

7. The method of claim 1, wherein controlling the strut to at least one of increase or decrease the strut length further includes:
   transmitting a first control signal to a first actuator of the strut to cause the first actuator to at least one of increase or decrease the strut length during a first flight of the turbofan engine;
   transmitting a second control signal to a second actuator of the strut to cause the second actuator to at least one of increase or decrease the strut length during a subsequent flight of the turbofan engine; and
   continuing to alternate between transmitting the first control signal to the first actuator and transmitting the second control signal to the second actuator during future subsequent flights of the turbofan engine.

8. The method of claim 1, further comprising:
   detecting, by a strain gauge, a current load applied to the fan case by the strut;
   predicting, by the controller, that the turbofan engine will change from a runway state in which an axis of the turbofan engine is parallel to a ground to a climbing state in which a forward end of the turbofan engine is farther from the ground than an aft end of the turbofan engine; and
   controlling the strut to increase the strut length to apply a pre-load to the fan case based on the current load to resist additional distortion of the centerline of the core of the turbofan engine due to an air load applied to an inlet of the turbofan engine in response to predicting that the turbofan engine will change from the runway state to the climbing state.

* * * * *